United States Patent
Le Saint et al.

(10) Patent No.: US 9,942,034 B2
(45) Date of Patent: Apr. 10, 2018

(54) CONFIDENTIAL COMMUNICATION MANAGEMENT

(71) Applicant: VISA INTERNATIONAL SERVICE ASSOCIATION, San Francisco, CA (US)

(72) Inventors: Eric Le Saint, Los Altos, CA (US); Soumendra Bhattacharya, Union City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 208 days.

(21) Appl. No.: 15/045,052

(22) Filed: Feb. 16, 2016

(65) Prior Publication Data
US 2016/0241389 A1    Aug. 18, 2016

Related U.S. Application Data

(60) Provisional application No. 62/116,357, filed on Feb. 13, 2015.

(51) Int. Cl.
*H04L 29/06* (2006.01)
*H04L 9/08* (2006.01)

(52) U.S. Cl.
CPC ................... *H04L 9/0844* (2013.01)

(58) Field of Classification Search
CPC ..................................... H04L 9/0844
USPC .......................................... 713/155
See application file for complete search history.

(56) References Cited

U.S. PATENT DOCUMENTS

| 6,944,762 | B1 | 9/2005 | Garrison et al. |
| 6,978,025 | B1 * | 12/2005 | Price, III ............... H04L 63/06 380/277 |
| 7,254,232 | B2 | 8/2007 | DiSanto |
| 7,421,576 | B1 | 9/2008 | Kent et al. |

(Continued)

FOREIGN PATENT DOCUMENTS

| JP | 11003033 | 1/1999 |
| KR | 1020050117478 | 12/2005 |

(Continued)

OTHER PUBLICATIONS

U.S. Appl. No. 62/014,102, filed Jun. 18, 2014, entitled, "Efficient Methods for Authenticated Communication," 108 pages.

(Continued)

*Primary Examiner* — Longbit Chai
(74) *Attorney, Agent, or Firm* — Kilpatrick Townsend & Stockton LLP

(57) ABSTRACT

Systems and methods are provided for confidential communication management. For instance, a server computer can include a protected server key identifier in a response message to a client computer. The protected server key identifier can include a server key identifier that identifies a server private key used to encrypt the response message. The client computer can pass the protected server key back in a subsequent request, so that the server computer can identify the proper server private key to use for decrypting the request message. In another example, a message may include encrypted protocol data (e.g., cipher suite) and separately encrypted payload data. The encrypted payload data can include a plurality of individually encrypted payload data elements.

38 Claims, 22 Drawing Sheets

(56) References Cited

U.S. PATENT DOCUMENTS

| | | |
|---|---|---|
| 7,627,760 B2 | 12/2009 | Lauter et al. |
| H2270 H | 6/2012 | Le Saint et al. |
| 8,200,974 B1 | 6/2012 | DiSanto |
| 2005/0084114 A1 | 4/2005 | Jung et al. |
| 2006/0010320 A1 | 1/2006 | Chuang et al. |
| 2006/0265595 A1 | 11/2006 | Scottodiluzio |
| 2007/0028090 A1 | 2/2007 | Lopez et al. |
| 2007/0033403 A1 | 2/2007 | Lauter et al. |
| 2007/0098158 A1* | 5/2007 | Tapson .................. G06F 21/10 380/37 |
| 2007/0288743 A1 | 12/2007 | Cam-Winget et al. |
| 2008/0133918 A1 | 6/2008 | You et al. |
| 2009/0318114 A1 | 12/2009 | Bertoni |
| 2011/0289311 A1* | 11/2011 | Roy-Chowdhury .. H04L 9/0844 713/151 |
| 2011/0307698 A1 | 12/2011 | Vanstone |
| 2012/0087493 A1 | 4/2012 | Chidambaram |
| 2012/0137132 A1 | 5/2012 | Le Saint |
| 2012/0221858 A1 | 8/2012 | Struik |
| 2012/0314865 A1 | 12/2012 | Kitchen |
| 2013/0016831 A1 | 1/2013 | Lambert |
| 2013/0091353 A1 | 4/2013 | Zhang et al. |
| 2013/0195271 A1 | 8/2013 | Miyabayashi et al. |
| 2013/0219189 A1 | 8/2013 | Simmons |
| 2013/0301828 A1 | 11/2013 | Gouget et al. |
| 2013/0332739 A1 | 12/2013 | Yi et al. |
| 2014/0003604 A1 | 1/2014 | Campagna |
| 2014/0208117 A1 | 7/2014 | Hayashi et al. |
| 2014/0365776 A1 | 12/2014 | Smets et al. |
| 2015/0200774 A1 | 7/2015 | Le Saint |
| 2015/0372811 A1 | 12/2015 | LeSaint |
| 2016/0065370 A1 | 3/2016 | Le Saint et al. |

FOREIGN PATENT DOCUMENTS

| | | |
|---|---|---|
| WO | 2013023968 A1 | 2/2013 |
| WO | 2014/109283 A1 | 7/2014 |
| WO | 2016/033610 A1 | 3/2016 |

OTHER PUBLICATIONS

U.S. Appl. No. 62/016,048, filed Jun. 23, 2014, entitled, "Efficient Methods for Forward Secure Authenticated Communication," 177 pages.

U.S. Appl. No. 62/044,172, filed Aug. 29, 2014, entitled, "Methods for Secure Cryptogram Generation," 106 pages.

"Tomorrow's Transactions," HCE and BLE University, London, Mar. 20, 2014, Consult Hyperion, http://tomorrowstransactions.com. 18 pages.

PCT/US2016/018106 , "International Search Report and Written Opinion", dated Jun. 2, 2016, 12 pages.

PCT/US2016/015218 , "International Search Report and Written Opinion", dated May 12, 2016, 17 pages.

\* cited by examiner

CONFIDENTIAL COMMUNICATION MANAGEMENT

CROSS-REFERENCES TO RELATED APPLICATIONS

The present application is a non-provisional and claims the benefit of priority to U.S. Provisional Application 62/116,357, filed on Feb. 13, 2015, which is hereby incorporated by reference in its entirety for all purposes.

BACKGROUND

Standard key agreement protocols (e.g., SSL/TLS and IPSec) may reveal information about the identities of parties involved and key agreement protocol type or cipher suite information. Such information may provide intelligence to attackers and help them trace sender and receiver activities, capture metadata and reverse engineer messages, and design time efficient and focused attack methods based on the apparent weaknesses.

Embodiments of the present invention address these problems and other problems individually and collectively.

BRIEF SUMMARY

Embodiments of the invention relate to systems and methods for confidential communication management. Specifically, the embodiments provide an improved key agreement protocol where the specification of keys and protocol data (e.g., cipher suite) remain confidential in the request and response messages, thereby reducing the opportunities for attackers and increasing the cost of attacks.

According to an aspect, methods are provided for confidential key identification. For example, in some embodiments, a server computer can receive a request from a client computer. The request message can include a protected server key identifier and encrypted request data. The server computer can decrypt the protected server key identifier using a server identifier encryption key to obtain a server key identifier. A server private key associated with the server key identifier can be determined. The encrypted data can be decrypted using the server private key to obtain request data.

According to another aspect, methods, systems, and apparatus are provided for protecting protocol data. For example, in some embodiments, a sender computer can encrypt payload data using one or more payload encryption keys to generate encrypted payload data. The sender computer can also encrypt protocol data using one or more protocol encryption keys to generate encrypted protocol data. The protocol data may indicate a cipher suite. The sender computer can transmit a message comprising the encrypted payload data and the encrypted protocol data to a receiver computer.

According to another aspect, methods, systems, and apparatus are provided for data protection. For example, in some embodiments, a sender computer can encrypt payload data using one or more payload encryption keys to generate encrypted payload data. The sender computer can also encrypt protocol data using one or more protocol encryption keys to generate encrypted protocol data. The protocol data may indicate a cipher suite. The sender computer can transmit a message comprising the encrypted payload data and the encrypted protocol data to a receiver computer.

In some embodiments, a computer system is provided. The computer system can be configured to receive a message comprising encrypted protocol data and encrypted payload data. One or more protocol decryption keys can be determined to decrypt the encrypted protocol data. The encrypted protocol data can be decrypted using the one or more protocol decryption keys to obtain protocol data. One or more payload decryption keys to decrypt the payload data can be determined. The encrypted payload data can be decrypted using the protocol data and the one or more payload decryption keys to obtain payload data.

TERMS

Figure 1:
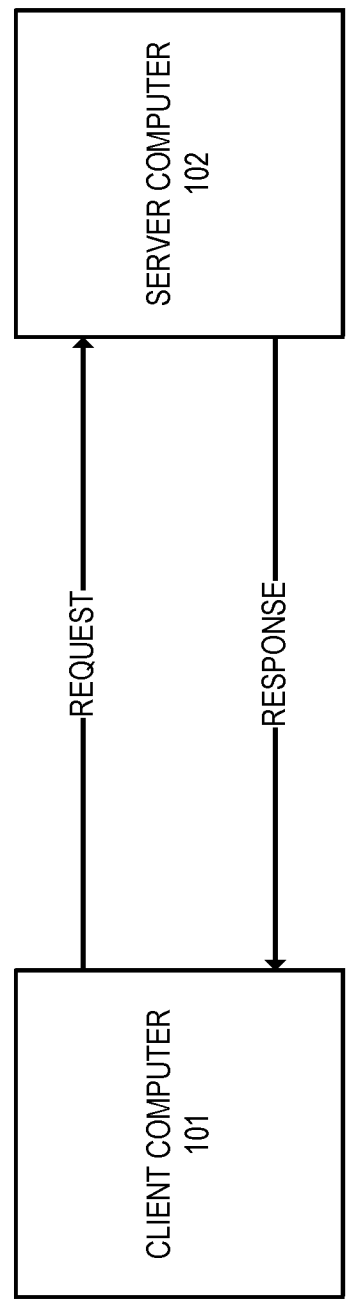
FIG. 1 illustrates communication between a client computer and a server computer, in accordance with some embodiments of the invention.

Prior to discussing embodiments of the invention, description of some terms may be helpful in understanding embodiments of the invention.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "public/private key pair" may include a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a Certification Authority (CA) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on RSA or elliptic curve cryptography (ECC).

A "digital signature" may refer to the result of applying an algorithm based on a public/private key pair, which allows a signing party to manifest, and a verifying party to verify, the authenticity and integrity of a document. The signing party acts by means of the private key and the verifying party acts by means of the public key. This process certifies the authenticity of the sender, the integrity of the signed document and the so-called principle of nonrepudiation, which does not allow disowning what has been signed. A certificate or other data that includes a digital signature by a signing party is said to be "signed" by the signing party.

A "digital certificate" or "certificate" may include an electronic document or data file that uses a digital signature to bind a public key and/or a corresponding private key with data associated with an identity. In some embodiments, a certificate can include a public key. The certificate may include one or more data fields, such as the legal name of the identity, a serial number of the certificate, a valid-from and valid-to date for the certificate, certificate-related permissions, etc. A certificate may contain a "valid-from" date indicating the first date the certificate is valid, and a "valid-to" date indicating the last date the certificate is valid. A certificate may also contain a hash of the data in the certificate including the data fields. Unless otherwise noted, each certificate is signed by a certificate authority.

A "certificate authority" (CA) may include one or more server computers operatively coupled to issue certificates to entities. The CA may prove its identity using a CA certificate, which includes the CA's public key. The CA certificate may be signed by another CA's private key, or may be signed by the same CA's private key. The latter is known as a self-signed certificate. The CA also typically maintains a database of all certificates issued by the CA.

In a typical process, the certificate authority receives an unsigned certificate from an entity whose identity is known. The unsigned certificate includes a public key, one or more data fields, and a hash of the data in the certificate. The CA signs the certificate with a private key corresponding to the public key included on the CA certificate. The CA may then store the signed certificate in a database, and issue the signed certificate to the entity.

A "cryptographic nonce" may include any number, string, bit sequence, or other data value intended to be used in association with a single communication session. In some cases, a cryptographic nonce may be randomly or pseudo-randomly generated. Typically, a cryptographic nonce is of sufficient length as to make insignificant the likelihood of independently generating the same nonce value multiple times.

A "blinded key," such as a "blinded public key" may include a key that has been obfuscated or otherwise modified from its original value by combination with another data element, such as a cryptographic nonce (e.g., a random or pseudo-random number). For example, a public key may be multiplied by the nonce to generate a "blinded public key." Similarly, a private key may be multiplied by the nonce to generate a "blinded private key."

An "encryption key" may include any data value or other information suitable to cryptographically encrypt data. A "decryption key" may include any data value or other information suitable to decrypt encrypted data. In some cases, an encryption key and a decryption key may be the same (i.e., a "symmetric key").

A "key identifier" can include any data that can be used to identify one or more keys or digital certificates. For example, a key identifier may identify a private key, a public key or a digital certificate thereof, or a private/public key pair. A key identifier may also identify one or more encryption keys, signing keys, or any other suitable keys. A key identifier can be a serial number associated with a digital certificate, wherein the certificate may be retrievable using the serial number. A key identifier can also include a random or pseudo-random number or alphanumeric string that identifies a private or public key. In some embodiments, the mapping between a key identifier and the associated key(s) or certificates can be stored in a table, a file, a database, or any other suitable data storage that supports lookup and/or storage operations.

A "client key identifier" is a key identifier that identifies one or more keys associated with a client computer. A "server key identifier" is a key identifier that identifies one or more keys associated with a server computer.

A "protected key identifier" can include a key identifier and possibly other data that is used to obscure or otherwise protect the confidentiality of the key identifier in some manner. In some embodiments, a protected key identifier merely refers to a one-time value that does not reveal any useful information to an eavesdropper (e.g., a random or pseudo-random value), but that is mapped to one or more keys or certificates. For example, a protected client key identifier can include a one-time random value that is mapped to a client private key or client public key.

A protected key identifier may also comprise a key identifier (with or without additional data) that has been encrypted using an encryption key (also referred to as a "identifier protection key"). For example, a protected server key identifier can include a server key identifier that is mapped to a client private key or client public key. In some embodiments, the protected key identifier may also include additional data, such as a padding and/or a random value. In some embodiments, the padding can be a constant data element. The presence of the constant data element in a result of the decryption of the protected key identifier can indicate validity or integrity of the key identifier. In some other embodiments, the padding may include a message authentication code (MAC) of the key identifier or otherwise generated based on the key identifier. The MAC can be used to authenticate the key identifier and/or other data included in the protected key identifier. The padding and/or the random value may be used to bring the length of the protected key identifier or the unencrypted data including the key identifier, padding, and random value to a fixed length, so as to obfuscate the key identifier and to make it more difficult for an eavesdropper to distinguish the protected key identifiers from any other fixed-length data. In some embodiments, the server key identifier and/or the additional data may be encrypted using an identifier encryption key or some other suitable encryption key to generate the protected key identifier.

In some embodiments, a protected key identifier can be decrypted, or otherwise processed to reveal the underlying key identifier. The key identifier can then be mapped to one or more underlying keys and/or certificates. In some other embodiments, the protected key identifier is not decrypted but used directly to retrieve the corresponding keys and/or certificate. The mappings can be stored in a table, a file, a database, or any other suitable data storage that supports lookup and/or storage operations.

An "identifier encryption key" or "identifier decryption key" can refer to any encryption key operable to encrypt or decrypt a key identifier. In some embodiments, an identifier encryption key may be the same as the identifier decryption key (e.g., symmetric encryption key). For example, a key identifier (and optionally other data) can be encrypted using the identifier encryption key to derive the protected key identifier discussed above. In some embodiments, the identifier encryption key may be determined using a certain public/private key pair and/or other suitable data. For example, in some embodiments, the identifier encryption key may be the result of a point multiplication of a public key and the corresponding private key. In this case, there is no need to independently manage the identifier encryption key since the identifier encryption key can always be recovered from the existing key pair. As another example, the identifier encryption key may be an encryption key that is separately maintained (e.g., stored in a secure element of a client computer or a server computer).

In various embodiments, one or more identifier encryption keys may be used and/or maintained by a single entity (e.g., a client computer or a server computer) in different situations. For instance, a first identifier encryption key may be used to encrypt/decrypt key identifiers for messages according to a first protocol or messages from a particular sender. A second, a different identifier encryption key may be used to encrypt/decrypt key identifiers for messages according to a second protocol or messages from another sender.

In some embodiments, information contained in the messages can indicate which identifier encryption keys to use and/or how to derive the identifier encryption keys. For instance, a header version in message A may be used to select a first default private/public key pair for generating a first identifier encryption key; whereas a different header version in message B may be used to select a second default private/public key pair for generating a second, different identifier encryption key. In some embodiments, the selection of the default private/public key pair or the identifier encryption key may be based on the identity of the sender of a message, credential information, or any other suitable data.

A "one-time key" refers to a key that is intended to be used only once for protecting a single transaction or other communication session (e.g., a request message or a response message) between two entities (e.g., a client computer and a server computer). For instance, a client computer may use a first client key to encrypt a request message sent to a server computer. The first client key may be used by the client computer to decrypt a response message corresponding to the first request message that is sent by the server computer. However, to encrypt the next request message, the client computer may use a second, different key. Thus, the first client key is a one-time client key that is used only for protecting the first request message from the client. Similarly, a one-time server key can be used to protect a single response message from a server computer.

A one-time key can includes a key that is generated anew for each new transaction or communication session (also referred to as an "ephemeral key"). Alternatively, a plurality of one-time keys can be generated from the same base or static key that stays the same across multiple transactions or communication sessions. Each of the plurality of one-time keys can be modified differently. For example, each of the one-time keys can be blinded using different cryptographic nonce, identification factor, or other blinding factors, or otherwise obfuscated differently.

One-time keys are typically removed at the end of a transaction or communication session. In some embodiments, however, one-time keys may be maintained for a prolonged period of time. For example, during asynchronous communication with a server computer, a client computer may send a request message but may not receive the corresponding response message for a long period of time or may receive the corresponding response message out of sequence (e.g., after receipt of a response message corresponding to a later transmitted request message). In this case, the one-time key associated with the earlier request need to be saved and used to decrypt the corresponding response message. A client computer that is communicating with multiple server computers substantially concurrently may also need to store multiple one-time private keys associated with respective transactions or communication sessions in order to decrypt the corresponding response messages. Similarly, a server computer communicating with multiple client computers also need to store multiple one-time keys associated with the respective transactions or communication sessions.

A "one-time key pair" can include a private key and a corresponding public key, where at least one of the two keys changes for each new transaction or communication session. The key pair can be of any suitable format, such as elliptic curve (EC) based keys or RSA based keys. In an example, both the private key and the corresponding public key may be generated anew for each new transaction. Thus, the one-time key pair comprises an ephemeral private key and an ephemeral public key. In another example, a one-time key pair may comprise a static private key that remains the same for more than one transactions but obfuscated differently each time, and an ephemeral public key. In yet another example, a one-time key pair may comprise a static public key that remains the same for more than one transactions, but obfuscated differently each time, and an ephemeral private key. In some embodiments, both of the private key and the public key of the one-time key pair are static but one or both of the keys may be blinded, obfuscated, or otherwise modified differently for each new communication session.

A "static key pair" may include a public key (i.e., a "static public key") and a private key (i.e., a "static private key") maintained over a period of time or for a given number of transactions or communication sessions. Typically, though not necessarily, a static private key may be stored securely, such as in a hardware security module (HSM) or secure element (SE). Typically, though not necessarily, a static public key may be bound to an identity through the use of a digital certificate. The static key pair may be of any suitable format, such as ECC or RSA.

A "shared secret" may include any data value or other information known only to authorized parties in a secure communication. A shared secret can be generated in any suitable manner, from any suitable data. For example, a Diffie-Hellman based algorithm, such as Elliptic-Curve Diffie-Hellman (ECDH) may be used to generate a shared secret from a private key and a public key. A request shared secret can refer to a shared secret that is used to protect the security of a request message. A response shared secret refers to a shared secret that is used to protect the security of a response message.

In some cases, a shared secret can be used to generate one or more keys. For example, a shared secret can be used to generate one or more session keys or protection keys (discussed below) for protecting the entire request or response message. As another example, a shared secret can be used to generate a plurality of keys each used to protection a portion of a message.

A "session key" or "protection key" can refer to a key (e.g., an encryption key or a decryption key) that is used to protect at least a portion of a request or response message in a communication session, or any other type of data. A request session key refers to a session key that is used to protect a request message. A response session key refers to a session key that is used to protect a response message. A session key can be generated based on a shared secret. For instance, a request session key can be generated based on a request shared secret and a response session key can be generated based on a response shared secret.

"Protocol data" refers to any data in a message that indicates how to encrypt, decrypt, or otherwise process payload data of a message, or any other type of data. Protocol data can include cipher suite information, data descriptor information (e.g., data-protocol mapping information), or other suitable data. A cipher suite can refer to a named combination of a key exchange algorithm (e.g., ECDHE_RSA), an encryption algorithm, a message authentication code, an authentication algorithm, and/or other algorithms used to protect the communication between a client computer and a server computer. In some embodiments, protocol data can also include key agreement information such as key agreement algorithms and parameters used to establish shared secrets and/or to generate keys. In some embodiments, the protocol data may not include cipher suite information. Instead, the cipher suite information may be hardcoded, fixed, and/or implicitly agreed by communication parties (e.g., a client computer and a server computer).

A cipher suite may define a channel strength (e.g., 128 bits, 192 bits, or 256 bits), a key derivation function (KDF) (e.g., AES-128, AES-394, or AES-256), an elliptic curve cryptography (ECC) key agreement curve or key generation algorithm (e.g., P-256, P-384, or P-521), a block cipher mode of operation (e.g., Offset Codebook Mode (OCB), Key Wrap, Counter with CBC-MAC (CCM), EAX, Encrypt-then-MAC (EtM), or Galois/Counter Mode (GCM)), a digital signature algorithm (e.g., Elliptic Curve Digital Signature Algorithm (ECDSA) or Digital Signature Algorithm (DSA)), a cryptographic hash function (e.g., SHA-256, SHA-384, or SHA-512), a nonce (e.g., 16 bytes, 24 bytes, or 32 bytes), and the like.

A sender and a receiver of a message can agree on a cipher suite used for communications between them. In some cases, a client computer and a server computer can exchange one or more messages to negotiate and agree on the cipher suite to be used for subsequent communication. For example, the client computer may send a list of cipher suites it supports to the server computer in a request message. The cipher suites may be listed in the order of preference of the client computer. For example, the first cipher suite on the cipher suite list may be the most preferred by the client computer, the second cipher suite may be less preferred by the client computer than the first cipher suite, and so on. The request message may not include any payload data. Alternatively, the request message can include payload data that is encrypted or otherwise encoded using the preferred cipher suite. In response, the server computer can select a cipher suite from the list of cipher suites provided by the client computer and include the selected cipher suite in a response message. The response message may not include any payload data. Alternatively, the response message can include payload data that is encrypted or otherwise encoded using the selected cipher suite.

"Payload data" or "application data" refers to the "cargo" or content carried by a message and not merely the header, protocol data, metadata, or other similar data in the message that is used to facilitate the delivery or processing of the message. Examples of payload data can include identification data sent in a provisioning request, credential data in a provisioning response from a server computer, application or transaction data in a transaction message, and the like. In a typical embodiment, payload data includes sensitive data that is preferably protected from unauthorized access.

DETAILED DESCRIPTION

Embodiments of the invention relate to systems and methods for confidential communication management.

Embodiments allow communication messages to include, in a secure manner, non-traceable references to keys (e.g., protected key identifiers) used by either side to determine the keys used to protect (e.g., encrypt or decrypt) request or response messages. For instance, a server computer can include a protected server key identifier in a response message to a client computer. The protected server key identifier can include a server key identifier that identifies a server private key used to encrypt the response message. The client computer can pass the protected server key back in a subsequent request, so that the server computer can identify the proper server private key to use for decrypting the request message.

Similarly, a client computer can include a protected client key identifier in request message to a server computer. The protected client key identifier can identify a client private key used to encrypt the request message. The server computer can pass the protected client key back in a response message, so that the client computer can identify the proper client private key to use for decrypting the response message. The capability to match response messages to the corresponding requests and client private keys is important to when the messages are asynchronous.

Embodiments also protect protocol data used for encrypting/decrypting payload data separately from the payload data. Sensitive payload data can be encrypted using one or more payload encryption keys to generate encrypted payload data. Protocol data including a cipher suite used for encrypting the payload data can also be encrypted using one or more protocol encryption keys. The protocol encryption keys and the payload encryption keys can be established based on a key agreement. The encrypted protocol data and the encrypted payload data can be send in a message.

When the message is received, the protocol data decryption keys and the payload decryption keys can be derived based on the key agreement. The encrypted protocol data can be decrypted using the protocol decryption keys to obtain the protocol data (e.g., cipher suite). The encrypted payload data can be decrypted using the protocol data and the payload decryption keys.

In some cases, the payload data can include a plurality of payload elements, each can be individually encrypted using different encryption keys. In such cases, the encrypted payload elements can be decrypted as needed to improve data security.

I. Systems

FIG. 1 illustrates communication between a client computer 101 and a server computer 102, in accordance with some embodiments. Both client computer 101 and server computer 102 may be any suitable computing device (e.g., mainframes, desktop or laptop computers, tablets, mobile devices, wearable devices, etc.).

As shown in FIG. 1, client computer 101 may send a request message to server computer 102. The request message may be of any suitable form. For example, in various embodiments, the request message may be one or more TCP/IP packets, an HTTP request message, or in any other suitable format. Typically, the request message may include a protected server key identifier that identifies a public key or certificate associated with the server computer. The request message may also include encrypted protocol data and encrypted payload data. The encrypted protocol data may include a protected client key identifier to allow the client computer to match asynchronous requests and responses.

The server computer 102 may process the request message. The server computer 102 may determine the server key identifier from the protected server key identifier in the request message. The corresponding server private key can be selected based on the server key identifier and used to generate one or more session keys. Some of the session keys can be used to decrypt the encrypted protocol data in the request message to obtain protocol data. Some of the other session keys can be used to decrypt the encrypted payload data according to the protocol data.

The server computer 102 may generate response data to send to client computer 101. The response can include the protected client key identifier. The response can also include a new protected key identifier to be used in a subsequent request. Additionally, the response can include encrypted protocol data and encrypted payload data.

The client computer 101 may determine the client key identifier from the protected client key identifier in the response message and select the corresponding client private key. One or more session keys can be generated using the client private key. Some of the session keys can be used to decrypt the encrypted protocol data in the response message to obtain protocol data. Some of the other session keys can be used to decrypt the encrypted payload data according to the protocol data.

II. Confidential Key Identification

FIGS. 2-9 describe methods for protecting the identification of keys in communication between a client and a server. Specifically, embodiments in accordance with the described methods can allow communication messages to include, in a secure manner, identifiers of keys to be used by the client or the server. The specification of keys in communication messages can increase the amount of information included in each message, thereby reducing the total number of messages that are need to authenticate transactions. For example, embodiments allow authentication between a client computer and a server computer to be established in a single pair of a request message and a response message. Furthermore, security of the communication is improved by including non-traceable references to keys used by either side (e.g., protected key identifiers) in the communication messages, so that only the intended party can determine the keys associated with the protected key identifiers. The key identifiers are protected in the messages in a manner such that the keys associated with the key identifiers remain confidential even if the messages are intercepted. Thus, embodiments improve security of communication without sacrificing efficiency.

A. Request Message Generation Method

Figure 2:
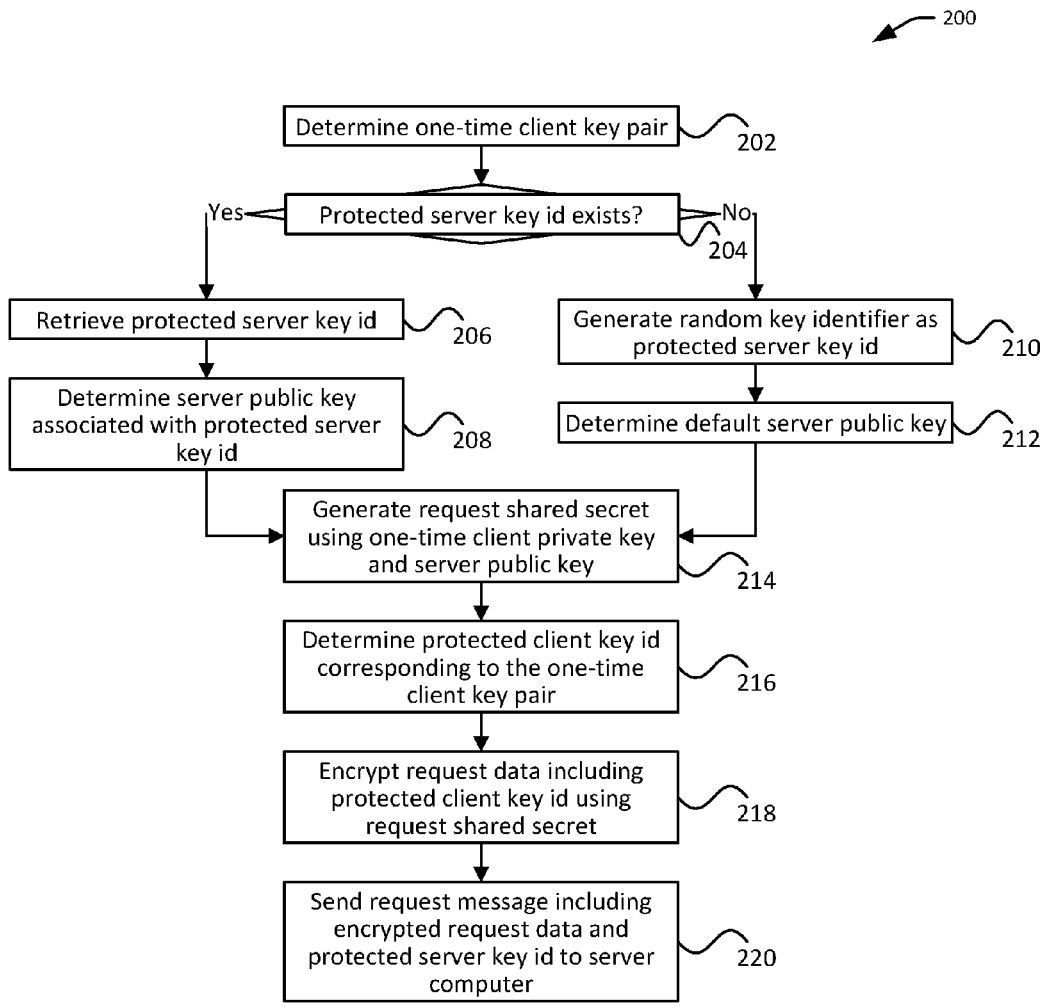
FIG. 2 illustrates an example process for generating and sending a request message, in accordance with some embodiments.

FIG. 2 illustrates an example process 200 for generating and sending a request message, in accordance with some embodiments. Typically, process 200 may be performed by a client computer, such as client computer 101, in order to send a message to a server computer (e.g., server computer 102). Some or all aspects of the process 200 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

At block 202, a one-time client key pair is determined. The one-time client key can include an ephemeral private key and an ephemeral public key that are generated, by the client computer, for each new request. Alternatively, the one-time client key can include a static private and/or a static public key that are blinded, obfuscated, or otherwise modified differently to generate different blinded keys for each new request. For instance, point multiplication may be performed on a static client public key with some other data element (e.g., a random number, a cryptographic nonce, identification factor, transaction data, etc.) to modify the value of the client public key for each request.

In some embodiments, a client computer may be configured to communicate with one or more server computers. As such, the client computer may maintain a set of one or more one-time client key pairs for some or all of the one or more server computers. Each client key pair in the set of one or more client key pairs corresponds to a particular request sent to a given server computer. The one-time client key pair can be determined to be associated with a particular request message for a particular server computer. In some embodiments, such as for asynchronous communication, the client computer can store, for a given server computer, a certain number of previously-generated client key pairs for previously-sent request messages, so as to enable decryption of an out-of-sequence response message corresponding to a previously-sent request message. The size of the set of previously generated client key pairs can be limited by a predetermined maximum number (e.g., 10).

At block 204, it is determined whether a protected server key identifier exists. In an embodiment, the client computer may store protected server key identifiers received from previous responses messages from one or more server computers. Each of the one or more server computers may be associated with a set of one or more protected server key identifiers, some or all of which may be received from previous response messages from the associated server computer. Each of the protected server key identifiers can be associated with a particular server public key and/or private key. The mappings between the server computers and the protected server key identifiers and between the protected server key identifiers and the corresponding server public keys and/or certificates may be stored in a table, a database, or any other suitable data storage associated with the client computer. Such mappings can be used to determine whether any protected server identifier (and hence server public key or certificate) exists for a given server computer to which a request message is to be sent. The existence of such protected server identifiers indicate that the client computer has previously received response messages from the server computer and extracted the protected server identifiers from those response messages. The lack of such protected server identifiers can indicate that the client computer has never previously received response messages from the server computer or has not received response messages from the server computer for a predetermined period of time.

If it is determined, at block 204, that one or more protected server key identifiers exist for the server computer, then at block 206, a protected server key identifier is retrieved from the one or more protected server key identifiers. Typically, the protected server key identifier associated with the most recently sent response message from the server computer is selected. In some cases, the most recently sent response message by the server computer is not necessarily the most recently received response message by the client computer when the response messages are received out-of-sequence.

At block 208, the server public key or certificate associated with the retrieved protected server key identifier can be retrieved. In some embodiments, a protected server key identifier and the corresponding server public key or certificate are received in the same response message. In some other embodiments, the protected server key identifier and the corresponding server public key or certificate are received in the different response message. In some cases, the protected server key identifier and/or the associated server public key or certificate may be received in the same or a different communication channel (e.g., email, text) than the communication channel for the request/response messages.

The most recently sent protected server key identifier and its associated server public key or certificate can indicate the latest key update or key rotation performed by the server computer. By including a new server public key or certificate and the associated new protected server key identifier in a response message, the server computer informs the client computer that a subsequent communication with the server computer should use the new server public key or certificate instead of an old one. In some embodiments, new public key or certificate may be used by the server computer to encrypt the request data in the current response message. As such, the new public key or certificate may be used by the client computer to decrypt the current response message.

If it is determined, at block 204, that no protected server key identifier exists for the server computer, then a random key identifier (also referred to as a pseudo key identifier) may be generated as the protected server key identifier at block 210. The random key identifier may not identify any existing server public key or server certificate. The random key identifier can include data generated using any suitable randomization or pseudo-randomization algorithm. In some embodiments, the random key identifier may be formatted such that it is apparent to a receiving server computer that the key identifier is random. In some embodiments, the random key identifier may be indistinguishable to a random value by an eavesdropper to a protected key identifier.

At block 212, a default or initial server public key or certificate is determined. A default server digital key or certificate may include any server public key or server certificate that is to be used in communication where no other public key or certificate has been previously defined for use between the client computer and the server computer. The default digital certificate may include a public key (i.e., a default public key). In some cases, a default digital certificate may be used during a first request sent from a client computer to a server computer. In some embodiments, the default digital certificate may be pre-loaded onto the client computer, and a private key associated with the default digital certificate (i.e., a default private key) may be loaded onto the server computer. In some embodiments, the default server certificate or public key may be provided to the client computer in the same or a different communication channel (e.g., email, text) than the communication channel for the request/response messages. In some embodiments, the default digital certificate to use may vary depending on the key agreement protocol (e.g., based on a version number of the protocol).

The random protected server key identifier generated at step 210 can be included in the request message to be sent to the server computer to indicate that the default or initial server public key is used by the client computer and that the server computer should do so it too.

At block 214, a request shared secret is generated using the one-time client private key that is determined at block 202 and the server public key or certificate determined at 208 or 212. The request shared secret can be used to protect (e.g., encrypt and/or decrypt) the request message as discussed below. In some embodiments, the server public key may be determined from a digital certificate of the server computer, which may have been previously obtained by client device (e.g., from a response message from the server computer or from some other channel).

The request shared secret may be generated using any suitable method. For example, in embodiments using elliptic curve cryptography, the shared secret may be determined using the elliptic-curve Diffie-Hellman protocol (ECDH).

Additionally or alternatively, the request shared secret can be generated using additional data. Such additional data can include an identification factor that is calculated using identification data and authentication data. Identification data may include any data or information associated with a user or a client device. Examples of identification data may include a name of a user associated with client device, an organization associated with client device, payment information such as a primary account number (PAN) or token associated with client device, an expiration date associated with the PAN or token, a certificate associated with client device, an IMEI or serial number of client device, etc. Authentication data may include any data or information suitable to authenticate a user or client device. Examples of authentication data may include a password or passphrase, a secret key (e.g., a private key), etc. An identification factor may include any data or information determined from identification data and/or authentication data. For example, in some embodiments, the identification factor may be generated by hashing a combination of the identification data and the authentication data.

At block 216, a protected client key identifier is optionally determined. The protected client key identifier corresponds to the private key of the one-time client key pair, the public key of the one-time client key pair, or both. In some cases, determining the protected client key identifier can include generating random or pseudo-random data as the protected client key identifier. In some other cases, determining the protected client key identifier can include encrypting a client key identifier using an encryption key. The client key identifier or the protected client key identifier can be associated with a private key of the one-time client key pair, the public key of the one-time client key pair, or both. The mappings can be maintained in a table, a database, or similar data storage at the client device.

When the server computer receives the protected client identifier in the request message, it can include the protected client identifier in a corresponding response message so that the client computer knows which one-time client private key to use in order to decrypt the response message (as discussed below). Thus, protected client identifier can be used by the client computer to map request and response messages, for example, during asynchronous communication. In some embodiments, block 216 may be optional and the request message may not include any protected client key identifier.

At block 218, request data is encrypted using the request shared secret. The request data optionally includes the protected client key identifier determined at block 216.

In some embodiments, a request session key may be generated based on the request shared secret. The request session key may be used to encrypt the request data. The request session key can be generated using the request shared secret and other suitable supplementary data such as key derivation data, if any. The request session key can also be referred to as a message protection key since it is used to protect a message between the client device and the server computer. Examples of such supplementary data may include a server computer identifier and/or a truncated one-time client public key.

The request session key may be of any suitable format (e.g., AES, DES, Blowfish, etc.), of any suitable length, and generated using any suitable key derivation function (KDF). For example, in one embodiment, the request session key may be generated using the Password-Based Key Derivation Function 2 (PBKDF2) algorithm. In some embodiments, other client computer data, such as a client device identifier, may be used as additional inputs to the key derivation function.

At block 220, the request message is sent to a server computer. The request message includes the encrypted request data and the protected server key identifier. The protected server key identifier can be a real protected server key identifier retrieved at block 206 or the random key identifier determined at block 210. The request message can also include a one-time client public key which may or may not be blinded. The request message can also include information that indicates how to decrypt the protected server key identifier. For instance, the request message can include a protocol version number which can be used by the receiving server computer to select the default server key(s) for decrypting the protected server identifier.

In some embodiments, the request message can also include identification data, a client computer identifier, authentication data, along with any other suitable data intended for the server computer. For example, the request data can also include client configuration information and/or directives for the service. In some examples, such information can be provided by client devices that do not a priori include means for strong authentication. In some embodiments, the request message may pass through one or more intermediaries (e.g., untrusted network) before reaching server computer.

B. Request Message Processing Methods

Figure 3:
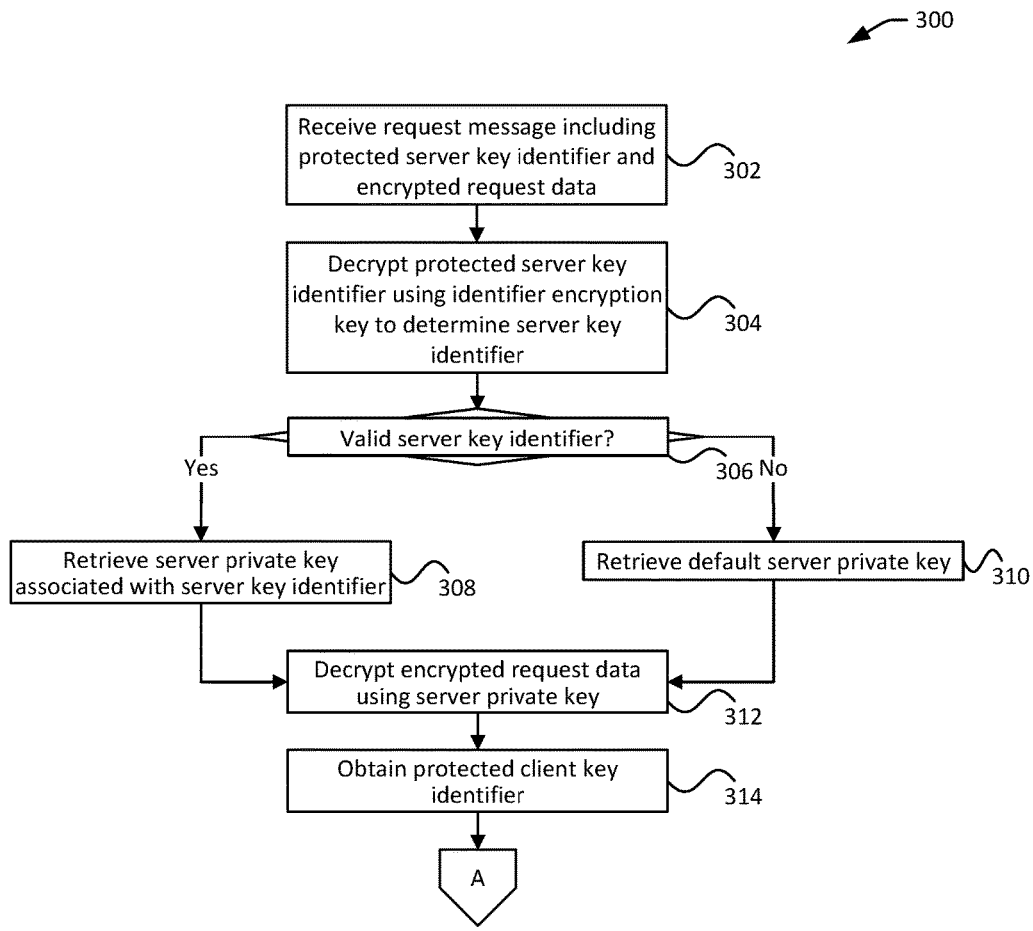
FIG. 3 illustrates an example process for receiving and processing a request message, in accordance with some embodiments.

FIG. 3 illustrates an example process 300 for receiving and processing a request message, in accordance with some embodiments. Typically, process 300 may be performed by a server computer (e.g., server computer 102) in response to receiving a request message from a client computer (e.g., client computer 101). However, in various embodiments, some or all of method 300 may be performed by another entity.

At block 302, a request message, including a protected server key identifier and encrypted request data, is received. Typically, the request message is received from the client computer. In addition, it should be noted that although the term "protected server key identifier" is used, in some embodiments it is not directly apparent from the received data whether the data is a random key identifier or a protected key identifier. The request message can also include a one-time client public key and optionally a protected client key identifier.

At block 304, the protected server key identifier is decrypted using an identifier encryption key to determine a server key identifier. An identifier encryption key may include any encryption key operable to encrypt and decrypt a key identifier. In some embodiments, the identifier encryption key may be determined using a default public/private key pair and/or other suitable data. For example, in some embodiments, the identifier encryption key may be the result of a point multiplication of the default public key and the default private key. In this case, the server computer does not need to independently manage identifier encryption keys since the identifier encryption keys can always be recovered from the existing key pair. As another example, the identifier encryption key is an encryption key maintained by the server computer (e.g., in a secure storage).

In some embodiments, the request message can include information that indicates how to decrypt the protected server key identifier. For instance, the request message can include a version number or other suitable information which can be used by the server computer to select the default public/private key pair from a plurality of default public/private key pairs for decrypting the protected server identifier, or otherwise identify the identifier encryption key.

At block 306, it is determined whether the server key identifier is valid. A valid server key identifier corresponds with a valid server public key or certificate, a valid server private key, or both. The server key identifier may be used to look up existing server public key or certificate or server private key in a table or database maintained by the server computer. If the lookup yields a hit, then the server key identifier may be considered valid. Otherwise, the server key identifier may be determined to be invalid. In some embodiments, the decryption of the protected server key identifier yields additional data besides the server key identifier such as a padding and/or a random number. The padding may be used to validate the authenticity and/or integrity of the key identifier. For instance, the padding may include a message authentication code of the key identifier and/or additional data. Alternatively, the padding can be a constant or known data element. The presence of the padding data element in a result of the decryption of the protected key identifier can indicate the validity or integrity of the key identifier (e.g., that the key identifier comes from a trusted source and/or that the key identifier has not been altered). In some other embodiments, the padding may include a message authentication code (MAC) of the key identifier or otherwise generated based on the key identifier.

If it is determined at block 306 that the server key identifier is valid, then a server private key associated with the server key identifier is retrieved at block 308. In some embodiments, the server key identifier is used to retrieve a public key or certificate. The private key corresponding to the public key or certificate is then retrieved. For example, if the server key identifier is a serial number, the digital certificate with the serial number is retrieved. In another example, if the key identifier is a public key, the digital certificate with the public key is determined. In some other embodiments, the server key identifier is used directly to retrieve a corresponding private key. The mappings between the key identifier and the corresponding public keys, certificates, and/or private keys may be stored in a table or database maintained by the server computer. In some embodiments, the private key may be retrieved from a secure element or hardware security module (HSM) on the server computer.

If it is determined at block 306 that the server key identifier is invalid, then a default server private key is retrieved at block 310. For example, the server key identifier obtained from decryption of the protected server key identifier may not correspond to any existing server public key, certificate, or private key. Alternatively or additionally, the validation of the server key identifier may fail because of the lack of an expected constant padding, or because of the mismatch of a MAC of the key identifier. In such cases, a default private key may be retrieved.

At block 312, the encrypted request data is decrypted using the server private key retrieved at block 308 or 310. In some embodiments, a request shared secret is determined using the server private key and a one-time client public key. The one-time client public key may have been provided by the request message. The one-time client public key may or may not be blinded or otherwise obfuscated. In some embodiments, a request session key is determined based on the request shared secret. The request session key can be used to decrypt the encrypted request data of the request message. The determination of the request shared secret and the request session key may be similar to that described in block 214 of FIG. 2.

At block 314, a protected client key identifier can be optionally obtained from the request data. The protected client key identifier may be similar to that described above in FIG. 2. In some embodiments, the request message may not include a protected client key identifier.

In some embodiments, the server computer may perform further processing based on data included in the request message. For instance, the server compute may obtain identification data, a client computer identifier, authentication data, along with any other suitable data from the request message.

The server computer may authenticate the client computer using the request data. The identification data can be verified using the client computer identifier. For example, in some embodiments, the client computer identifier may be used to retrieve corresponding identification data from a device database. The decrypted identification data can then be verified by comparison to the received identification data. In some embodiments, the identification data can include the client computer identifier.

Authentication data associated with the client computer identifier and/or the identification data can be retrieved. Authentication data may include any data or information suitable to authenticate a user or client computer. Examples of authentication data may include a password or passphrase, a secret key (e.g., a private key), etc. In some embodiments, the authentication data can be retrieved from a device database.

An identification factor can be generated using the retrieved authentication data and the identification data. An identification factor may include any data or information determined from identification data and/or authentication data. For example, in some embodiments, the identification factor may be generated by hashing a combination of the identification data and the authentication data.

The one-time client public key can be verified to ensure that the one-time client public key matches an expected value. For example, in some cases, a blinded one-time public key may be generated using a one-time public key extracted from the decrypted request data, and the identification factor determined above. The blinded one-time public key may then be compared to the one-time public key received as part of the request message (e.g., in a clear text portion of the request message) to ensure that the keys match. If the keys match, client computer may be authenticated. Otherwise, authentication may fail.

It should be noted that this method of authentication (i.e., verifying a combined ephemeral key) provides the advantage that authentication data, which may be sensitive, does not need to be transmitted in plaintext, even in encrypted form. Thus, even if the server private key is later compromised (however unlikely), the plaintext authentication data is not exposed. Furthermore, since blinding of a key is typically irreversible, an attacker cannot derive the identification factor, let alone the authentication data used to generate the identification factor, even with knowledge of both the blinded client public key and the unblinded client public key (e.g., ephemeral public key).

In some embodiments, the request data can include protocol data (e.g., cipher suite information, data mapping information, etc.) and payload data (e.g., credential data). The protocol data and the payload data can be separately encrypted according to various embodiments described herein to further enhance data security.

C. Response Message Generation Methods

Figure 4:
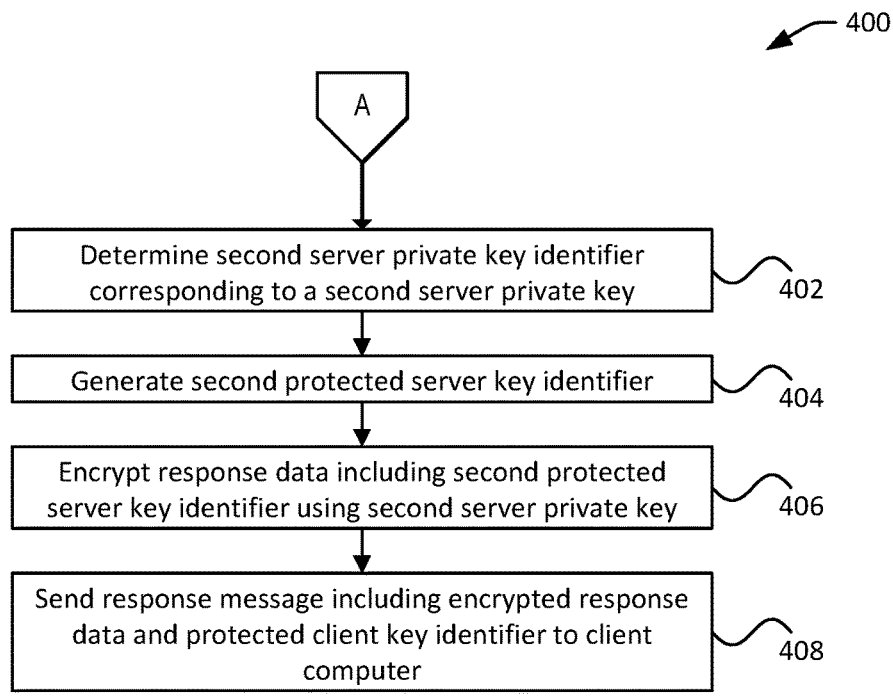
FIG. 4 illustrates an example process for generating and sending a response message, in accordance with some embodiments.

FIG. 4 illustrates an example process 400 for generating and sending a response message, in accordance with some embodiments. Typically, process 400 may be performed by a server computer (e.g., server computer 102) after a request message from a client computer (e.g., client computer 101) has been received and processed (e.g., in accordance with process 300). However, in various embodiments, some or all of process 400 may be performed by another entity.

At block 402, a second server private key identifier is determined. The second server private key identifier identifies a second server private key and a second server public key or certificate that are different from those associated with the protected server key identifier in the received request message. The second public/private keys may be static keys or one-time keys. The second public key or certificate is to be used by the client computer in a subsequent communication (such as a future request message). By changing the server key, security of data communication is improved and the potential impact of exposure of one server key is minimized. Using methods described herein, such key rotation can be performed in a confidential manner that is transparent to an eavesdropper.

At block 404, a second protected server key identifier is generated for the second server key identifier. In some embodiments, the second protected key identifier may also include additional data, such as a padding and/or a random value. The padding may include a constant data known to the server computer, or a message authentication code (MAC) of the key identifier. The padding and/or the random value may be used to bring the length of the second protected key identifier or the unencrypted data including the key identifier, padding, and random value to a fixed length, so as to further obfuscate the second key identifier and to make it more difficult for an eavesdropper to distinguish the second protected key identifiers from any other fixed-length data. In some embodiments, the random or pseudo-random number may be different than the random or pseudo-random number for the previous protected server key identifier to further obfuscate the key identifier. The second server key identifier and/or the additional data may be encrypted using the identifier encryption key or some other suitable encryption key known to the server computer.

In some embodiments, the server key may not be changed with every response. Instead, the server key may not be changed for a period of time or a given number of transactions. When there is no key change, the response message does not include the second server public key and the second protected server key identifier. Instead, the response message may include the same protected server key identifier as previously provided or not include any protected server key identifier at all.

At block 406, response data is encrypted using second server private key. In some embodiments, a response shared secret can be generated using the second server private key and the one-time client public key. The one-time client public key may be obtained from a request message and may or may not be blinded. In some embodiments, the second server public key and/or the second server private key can be blinded using a cryptographic nonce a cryptographic nonce (e.g., a random or pseudo-random data value) and/or the identification factor. The response shared secret can be generated using the blinded static server private key and the one-time client public key. In an alternative embodiment, the static server private key is not blinded. Instead, the one-time client public key is blinded. The response shared secret may be generated using any suitable method, such as ECDH.

A response session key can be determined using the response shared secret, KDFs, and other suitable supplementary data such as key derivation data, if any. The response session key can also be referred to as a message protection key since it is used to protect a message between the client computer and the server computer. Examples of such supplementary data may include a server computer identifier, a client device identifier, and/or a truncated client public key.

Response data to be included in a response message can be determined. The response data can include the second protected server key identifier. Additionally, the response data can optionally include the second server public key or certificate and/or protocol data (e.g., cipher suite information, data mapping information) described elsewhere. In some embodiments, the response data can include credential data, which refers to any data specifically provisioned for the given client device (e.g., mobile device) or a given group of devices, so as to enable the client device to conduct transactions (e.g., payment transactions). Examples of credential data can include tokens, PAN, or other account information, one or more keys (e.g., LUKs used to generate cryptograms, encryption key, blinded or unblended static public keys, etc.), key derivation parameters (e.g., for deriving a SUK that is used to generate a cryptogram, a shared secret key, an encryption key, etc.), cryptogram derivation parameters, certificate chain information, transaction parameters, and any other suitable data. The response data may be encrypted using the second server private key and included in the response message.

Besides encrypted response data, the response message can also include information that is not encrypted using the second server private key. Such information can optionally include the protected client key identifier obtained from the request message, the server computer certificate chain, a blinded or ephemeral second server public key, a cryptographic nonce, and the like. The server computer certificate chain can be validated by the client computer to verify the identity of the server computer. The blinded or ephemeral second server public key may be validated, by the client computer, against the second server public key included to in the encrypted request data.

At block 408, the response message discussed above is sent to the client computer. The response message includes the encrypted response data and, optionally, the protected client key identifier obtained from the request message. However, in some embodiments, the protected key identifier may be omitted from the response message. The response message may pass through one or more intermediaries (e.g., untrusted network) before reaching the client computer.

In some embodiments, the response message can include protocol data (e.g., cipher suite information, data mapping information, etc.) that is separately encrypted from the encrypted payload (e.g., credential data) according to various embodiments described herein to further enhance data security.

D. Response Message Processing Methods

Figure 5:
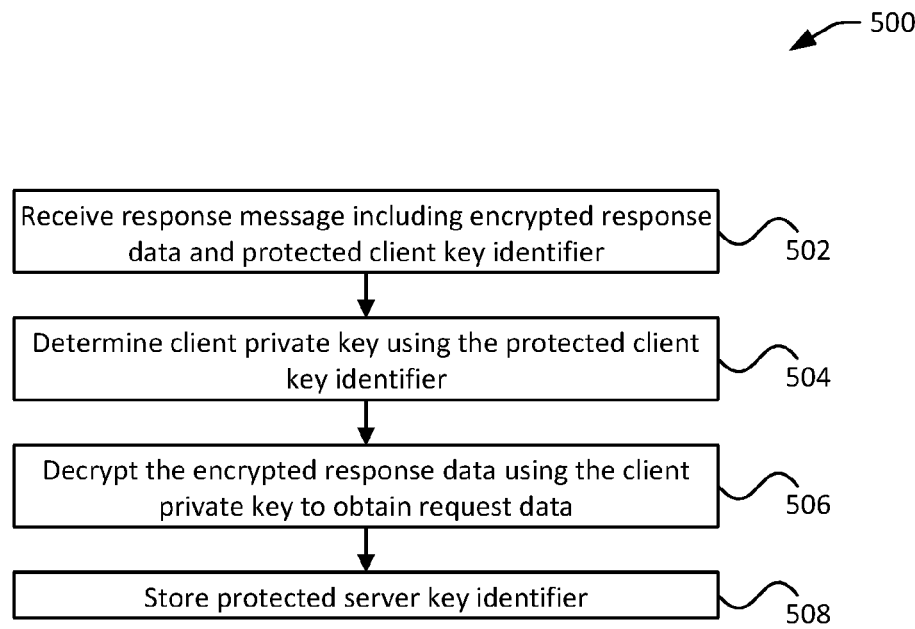
FIG. 5 illustrates an example process for receiving and processing a response message, in accordance with some embodiments.

FIG. 5 illustrates an example process 500 for receiving and processing a response message, in accordance with some embodiments. Typically, process 500 may be performed by a client computer (e.g., client computer 101), in response to receiving a response message (e.g., that generated in process 400) from a server computer (e.g., server computer 102). However, in various embodiments, some or all of process 500 may be performed by another entity.

At block 502, a response message including encrypted response data and a protected client key identifier is received. In some embodiments, the protected client key identifier may be used to determine the sequence of messages to process. For example, if response message(s) corresponding to earlier requests have not been processed, then steps 502 and 504 may be postponed until the earlier response messages have been received and processed. However, in some embodiments, the protected client key identifier may be omitted.

The response message may include a one-time server public key. The one-time server public key can correspond to a server private key that is used to generate the response message. The one-time server public key can be a blinded or otherwise obfuscated form of a static server public key. The advantage of providing a blinded static server public key is that the static server computer public key is obfuscated and the identity of the server computer protected against eavesdropping. Where the static server public key is not blinded, a cryptographic nonce may be provided as part of the response data and used to compute cryptograms. For instance, the cryptographic nonce from the server (entropy) can be used or stored for further derivation or a second cryptographic nonce can be provided as part of the derivation parameters.

At block 504, a client private key is determined using the protected client key identifier. The client private key can be the one-time client private key that was used to encrypt a request message corresponding to the received response message. In some other cases, the protected private key identifier can include data generated using any suitable randomization or pseudo-randomization algorithm. In some other cases, the protected client key identifier can be generated by encrypting a client key identifier using an encryption key. Determining the client private key can including retrieving the associated client private key using the protected client key identifier or using the client key identifier in a table, a database, or similar data storage maintained by client computer. If a corresponding client private key does not exist, a default client private key may be retrieved instead.

At block 506, the encrypted response data is decrypted using the client private key to obtain response data. In some embodiments, a response shared secret can be determined using the client private key (which may be ephemeral, static, or semi-static) and a blinded server public key. In some embodiments, a blinded server public key can be received from server computer, for example, as part of the response message or from a separate channel. In some other embodiments, the client computer may be pre-loaded with or otherwise have access to the server public key or certificate (which may be static). The blinding data (e.g., a cryptographic nonce, a random number) may be provided to client device as part of the response message or in a separate channel. In such cases, the blinded server public key may be derived by the client computer using the server public key and the provided blinding data. In some embodiments, the cryptographic nonce can also be used to verify a server computer certificate, as discussed elsewhere. In some embodiments, the response shared secret may be generated from the client private key and the blinded server public key using any suitable method, such as ECDH.

A response session key can be determined using the response shared secret, KDFs, and other suitable supplementary data such as key derivation data, if any. The response session key can also be referred to as a message protection key since it is used to protect a message between the user device and the server computer. Examples of such supplementary data may include a server computer identifier, a client computer identifier, and/or a truncated client public key.

The response session key may be of any suitable format (e.g., AES, DES, Blowfish, etc.), of any suitable length, and generated using any suitable key derivation function (KDF). For example, in one embodiment, the response session key may be generated using the Password-Based Key Derivation Function 2 (PBKDF2) algorithm. In some embodiments, other user device specific data, such as a user device identifier or other device fingerprint information, may be used as additional inputs to the key derivation function.

The response message can be decrypted using the response session key to obtain response data. The response data can include protected server identifier, encrypted credential data, a cryptographic nonce, a server computer certificate chain, key derivation data, cipher suite descriptors, and any other application data as discussed elsewhere.

Authentication of the server computer can be performed by the client computer using the data included in the response message. The server computer certificate chain can be validated. The server computer certificate chain may be validated using any suitable online or offline method. For example, for each of the one or more certificates in the chain, the digital signature of the certificate can be validated using a known trusted public key (e.g., a certificate authority's public key, or a public key of an entity appropriately authorized by the CA). For example, in some embodiments, a digital signature algorithm, such as the elliptic curve digital signature algorithm (ECDSA) may be used to validate a certificate. In some embodiments, a server computer certificate may be verified using a cryptographic nonce that is provided as part of the provisioning response message (e.g., as part of the credentials).

The blinded static server computer public key can be verified using the server computer certificate and the cryptographic nonce. Verifying the blinded static server computer public key may include ensuring that the blinded static server computer public key matches an expected value. For example, in some cases, a second blinded static server computer public key may be generated using the static server computer public key included on the server computer certificate, and a cryptographic nonce extracted from the response data. The second blinded static server computer public key may then be compared to the received blinded static server computer public key to ensure that the keys match. Alternatively, in some cases, the received blinded static server computer public key may be verified by comparing it to a stored blinded static server computer public key. If the keys match, server computer may be authenticated. Otherwise, authentication may fail. In some embodiments, the blinded static public key can be provided both in the clear text and in the cipher text of the response message so as to enable verification and prevent tampering.

It should be noted that this method of authentication (i.e., verifying a blinded static public key) can provide the advantage that the static server computer public key, which may be considered sensitive (as it may reveal the identity of the server computer), does not need to be transmitted in clear text. Thus, authentication of server computer can be performed while protecting the identity of server computer from an eavesdropper that captures the response message.

The response data can also include credential data. The credential data may include any data that is provisioned from the server computer to the client computer that enables the client computer to conduct transactions (e.g., payment transactions). Examples of credential data can include tokens, PAN, or other account information, one or more keys (e.g., LUKs used to generate cryptograms, encryption key, blinded or unblinded static public keys, etc.), key derivation parameters (e.g., for deriving a SUK that is used to generate a cryptogram, a shared secret key, an encryption key, etc.), cryptogram derivation parameters, certificate chain information, transaction parameters, and any other suitable data.

In some embodiments, the response data can include protocol data (e.g., cipher suite information, data mapping information, etc.) and application data (e.g., credential data). The protocol data and the payload data can be processed according to various techniques described herein.

At block 508, the protected server key identifier obtained from the response data can be stored. The response data can also include a protected server key identifier such as the second protected server key identifier discussed in the process 400. The server key identifier included in the protected server key identifier typically identifies the server public key (blinded or not blinded) that is provided in the response message. For example, in some embodiments, the protected key identifier may be associated with the corresponding server public key and/or certificate and the server computer in a database. Accordingly, future communication with the server computer may use the same protected key identifier and/or server public key. For instance, a subsequent request message for the server computer may include the protected key identifier and encrypted using the server public key, as described in process 200.

E. Example First Request Message and Processing Thereof

Figure 6:
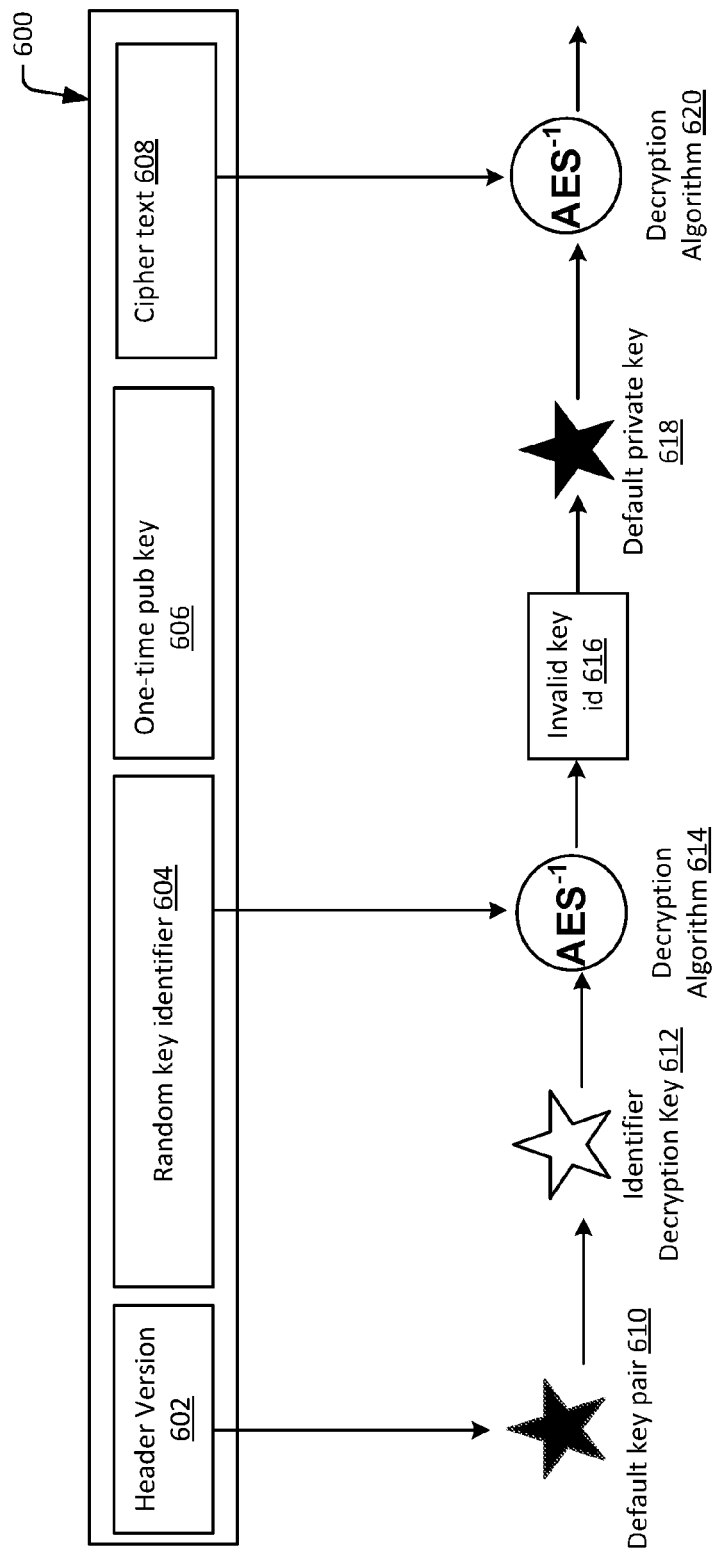
FIG. 6 illustrates an example of a first request message sent by a client computer to a server computer and the processing of the first request message by the server computer, in accordance with some embodiments.

FIG. 6 illustrates an example of a first request message 600 sent by a client computer to a server computer and the processing of the first request message 600 by the server computer, in accordance with some embodiments. In particular, the first request message 600 includes a random key identifier that does not represent a valid server key identifier. The invalid server key identifier signals the server computer to use a default server private key to decrypt the encrypted request data.

As shown in FIG. 6, the first request message 600 includes a header version 602, a random key identifier 604, a one-time client public key 606 (e.g., an ephemeral or blinded public key) associated with the client computer, and cipher text 608 (i.e., encrypted request data). The random key identifier 604 may have been generated by the client computer instead of the server computer.

Upon receiving the first request message 600, the server computer can select a default key pair 610 (also referred to as an initial key pair) using the header version 602. As discussed before, different header version values can correspond to different default key pairs, each comprising a default public key and a default private key. The default key pair 610 can be used to derive an identifier decryption key 612 used for decrypting the random key identifier 604. For example, the identifier decryption key 612 can be derived by point multiplying the default public key and the default private key of the default key pair 610. The server computer then attempts to decrypt the random key identifier 604 using the identifier decryption key 612 using a decryption algorithm 614 to determine a key identifier. However, since the random key identifier 604 represents a random or pseudo-random value, as opposed to a protected key identifier of a valid key identifier, the result of the decryption is an invalid key identifier 616. The invalidity of the decryption result causes the server computer to use a default private key 618 for decrypting the cipher text 608 (e.g., using a decryption algorithm 620). The default private key 618 may be part of the default key pair 610. In some embodiments, there may be more than one default key pairs for different uses and purposes, and the default private key 618 used for decrypting the cipher text 608 may be part of a different default key pair than the default key pair 610 used to derive the identifier encryption key 612. In some embodiments, the one-time public key 606 can be used in conjunction with the default private key 618 to decrypt the cipher text 608. Embodiments of methods for processing the first request message 600 are described in of FIG. 3.

F. Example Subsequent Request Message and Processing Thereof

Figure 7:
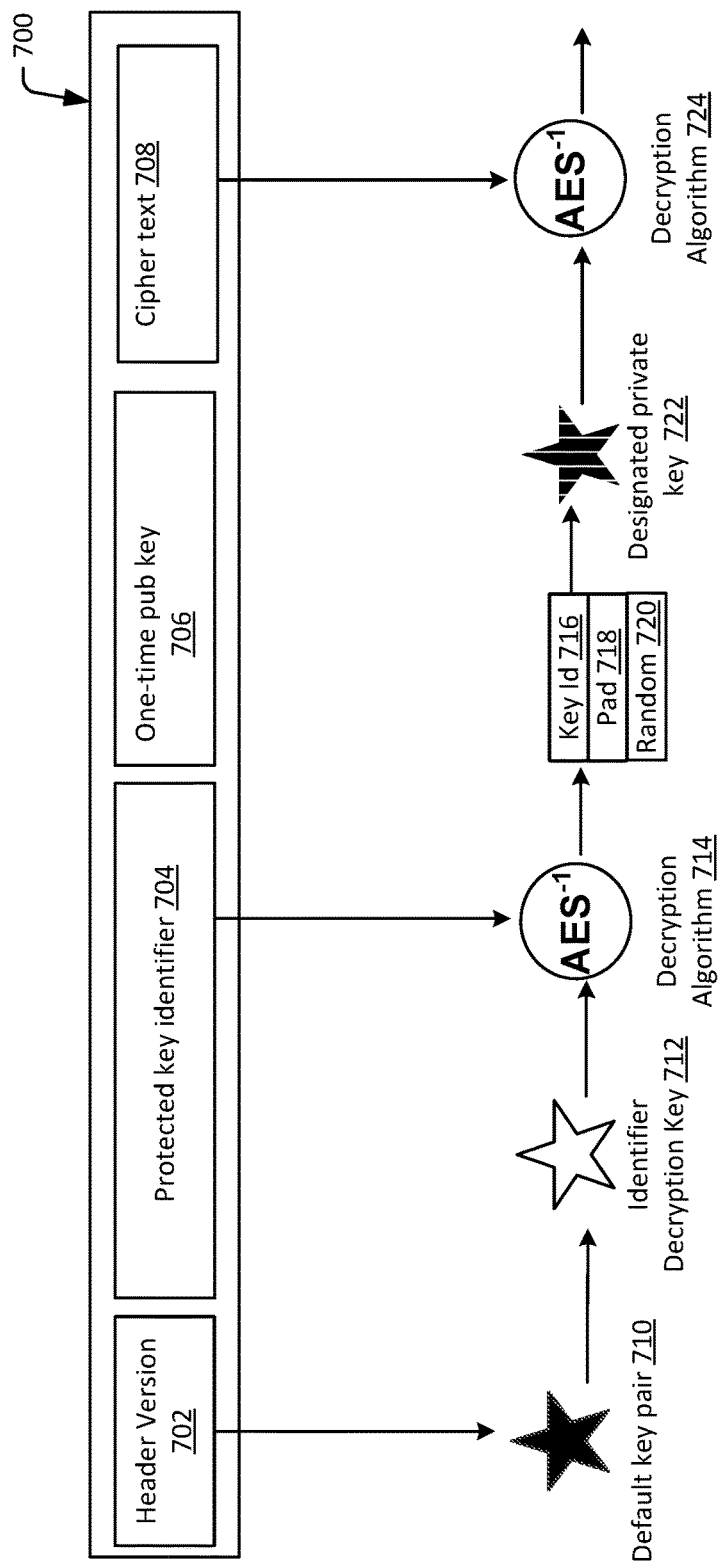
FIG. 7 illustrates an example of a subsequent request message sent by a client computer to a server computer and the processing of the subsequent request message by the server computer, in accordance with some embodiments.

FIG. 7 illustrates an example of a subsequent request message 700 sent by a client computer to a server computer and the processing of the subsequent request message by the server computer, in accordance with some embodiments. The request message 700 may be sent after a first request message 600 illustrated in FIG. 6. Between the first and the subsequent request messages, the client computer may have received a protected server key identifier that represents a valid server key identifier (e.g., in a response message from the server computer). Thus, unlike the first request message 600, the subsequent request message 700 includes a protected server key identifier 704 that can be decrypted to a valid server key identifier (as opposed to an invalid value). The valid server key identifier identifies a designated server private key for decrypting the encrypted request data.

As shown in FIG. 7, the subsequent request message 700 includes a header version 702, a protected key identifier 704, a one-time client public key 706 (e.g., an ephemeral or blinded public key) associated with the client computer, and cipher text 708 (i.e., encrypted request data). The protected key identifier 704 may have been generated by the server computer (and sent to the client computer in a response message or an out-of-band channel) instead of the client computer.

Upon receiving the request message 700, the server computer can select a default key pair 710 using the header version 702. The default key pair 710 can be used to derive an identifier decryption key 712 used for decrypting the protected key identifier 704. For example, the identifier decryption key 712 can be derived by multiplying the default public key and the default private key of the default key pair 710. The server computer then attempts to decrypt the protected key identifier 704 using the identifier decryption key 712 using a decryption algorithm 714 to determine a key identifier 716, and possible additional data such as a padding 718, and random data 720. In some embodiments, the padding 718 can be used to validate the key identifier. For example, if the padding is the same as a constant data element that is known to have been included with the key identifier in the original protected key identifier. Then the presence of the padding in the decrypted protected key identifier can indicate the authenticity and/or integrity of the key identifier. As another example, the padding 718 can be a MAC of the key identifier 716 and the MAC can be validated. The random data 720 and/or the padding may be included to obfuscate the key identifier and/or to bring the protected key identifier, the unencrypted data including the key identifier, padding, and random value, and/or the message to a fixed length.

The key identifier 716, once validated, can be used to select the designated private key 722, which is used to decrypt the cipher text 708 (e.g., using a decryption algorithm 724). In some embodiments, the one-time client public key 706 can be used in conjunction with the designated private key 722 to decrypt the cipher text 708. Embodiments of methods for processing the subsequent request message 700 are described in of FIG. 3.

G. Example Response Message and Generation Thereof

Figure 8:
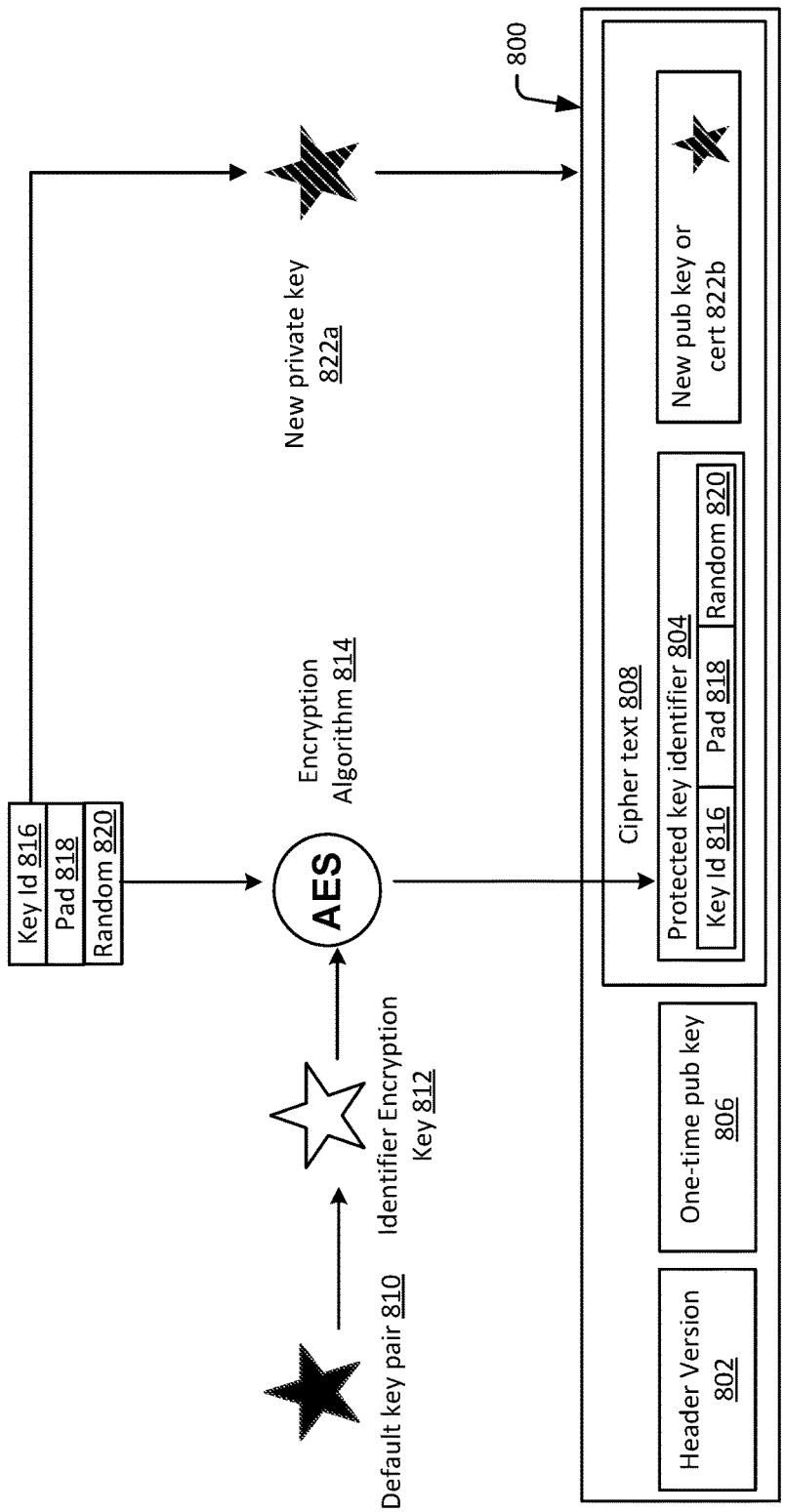
FIG. 8 shows an example of a response message sent by a server computer to a client computer and the generation of the response message, in accordance with some embodiments.

FIG. 8 shows an example of a response message 800 sent by a server computer to a client computer and the generation of the response message 800, in accordance with some embodiments. Specifically, the response message 800 includes and protects the confidentiality of a new key identifier that identifies a new server key or keys (e.g., new static server private/public key pair) to be used for subsequent communications. For instance, the response message 800 can be generated by the server computer after receiving a first request message 600 of FIG. 6 or a subsequent request message 700 of FIG. 700.

The request message 800 can include a header version 802 that identifies a version number associated with a default key pair 810. The default key pair 810 can be used to derive an identifier encryption key 812 in a similar manner as described in FIGS. 6-7. For instance, the identifier encryption key 812 can be derived by multiplying the default private key and the default public key of the default key pair 810. The identifier encryption key 812 can be used to encrypt a server key identifier 816 and other related data (e.g., padding data 818 and random data 820) via an encryption algorithm 814 to obtain the protected key identifier 804.

The key identifier 816 identifies a new server key pair comprising a private key 822a and a public key or certificate 822b. In some embodiments, the padding can be a constant data element. The presence of the constant data element in a result of the decryption of the protected key identifier can indicate validity or integrity of the key identifier. In some other embodiments, the padding data can include a MAC of the key identifier 816 or other authentication data that can be used to validate the authenticity and/or integrity of the key identifier 816. The random data 820 can ensure that the protected key identifier is always changing. In some embodiments, the padding data 818 and/or the random data 820 can be used to bring the size of the protected key identifier 804, the unencrypted data including the key identifier, padding, and random value, or the message to a fixed length to provide additional data security.

Response data including the protected key identifier 804 and the new public key or certificate 822b can be encrypted using the new private key 822a to generate the cipher text 808. In some embodiments, inclusion of the a new protected key identifier can avoid the repetition of the protected key identifier value in multiple messages (e.g., in request and response messages), which may lead to traceability of the protected key identifier between the messages. Even when the same key identifier is included, the random value 820 can be varied so as to generate different protected key identifier 804.

In some cases, the request data can also include other data that needs to be encrypted such as credential data. The cipher text 808 is included in the response message 800. The response message 800 also includes a one-time public key 806 that corresponds with the new public key or certificate 822b. For instance, if the public key 822b is a static key, the one-time public key 806 can be a blinded form of the static public key 822b. Alternatively, if the public key 822b is an ephemeral key, the one-time public key 806 can be the same as the ephemeral public key 822b.

H. Example Request and Response Messages with Client Key Identifier

As discussed above, a client computer may submit multiple asynchronous requests and receive responses in any order. To allow mapping between requests and responses from the client computer's side, a response messages can include a protected client key reference (also referred to as a "random request identifier") that is a non-traceable reference to the corresponding request message and to the client private key operable to be used, by the client computer, to encrypt the request and/or decrypt the response message.

For each request/response pair, the client computer generates a protected client key identifier (random request identifier) or any one time value that does not reveal reusable bits. The protected client key identifier is encrypted and included in the cipher text of the request message Upon receiving the request message including the protected client key identifier, the server computer decrypts the request message to obtain the protected client key identifier. The server computer then includes the protected client key identifier in a response message responsive to the request message. In an embodiment, the protected client key identifier can be included as the first data element in the plain text section of the response message.

Figure 9:
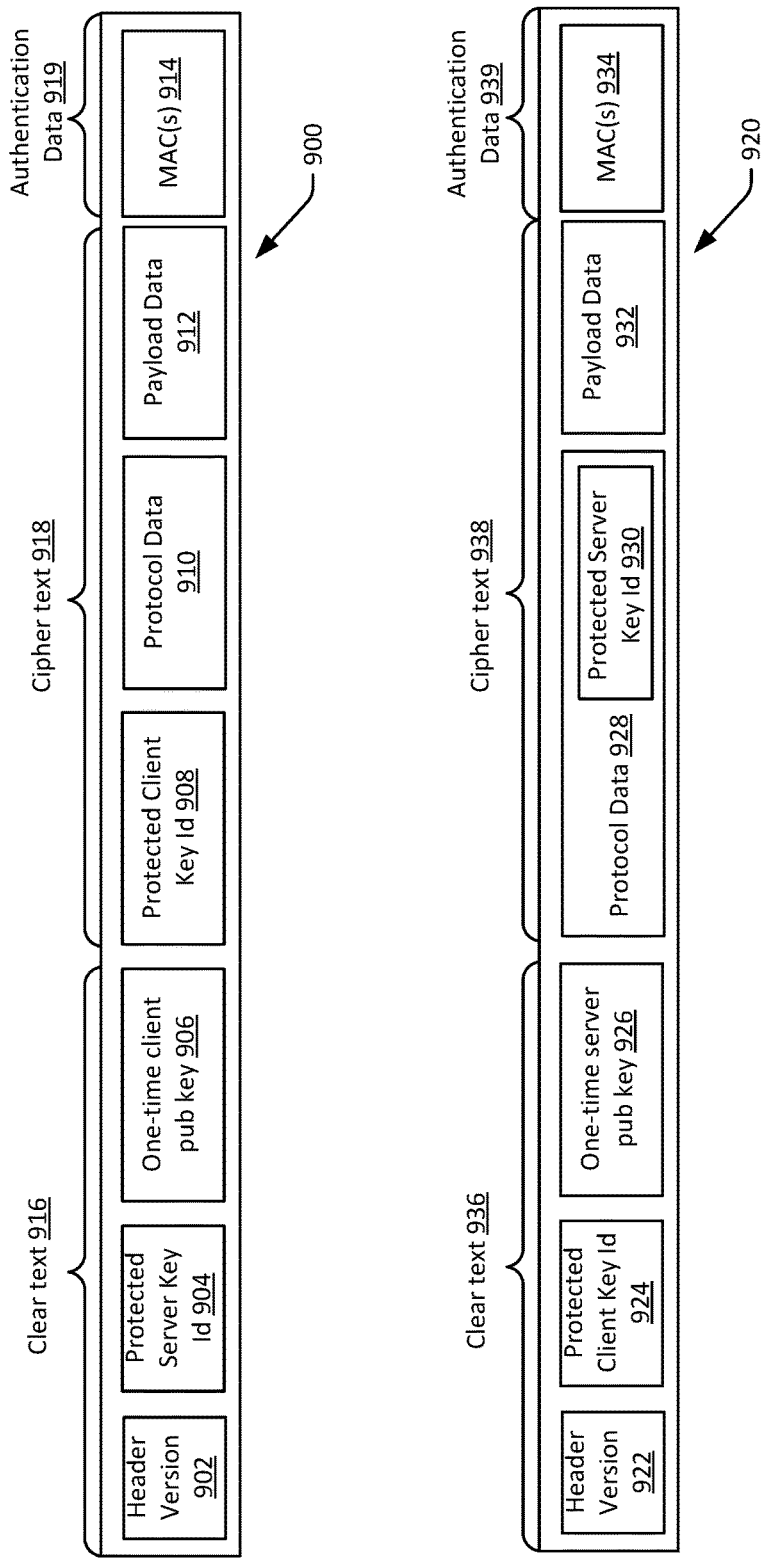
FIG. 9 illustrates an example request message and an example response message that include a protected client key identifier, in accordance with some embodiments.

FIG. 9 illustrates an example request message 900 and an example response message 920 that include a protected client key identifier, in accordance with some embodiments. The request message 900 can be sent by a client computer to a server computer and the response message 920 can be sent by the server computer to the client computer.

As shown in FIG. 9, the request message 900 includes a protected client key identifier 908 in the cipher text 918 of the message. For example, the client key identifier 908 can be encrypted with a request session key to be included in the cipher text. In some embodiments, the inclusion of the protected key identifier in the cipher text can protect the confidentiality of the client key identifier. The protected client key identifier 908 can be generated or determined by the client computer and is associated with a client private key or a client key pair that is used to protect the request message. For example, the protected client key identifier 908 can be associated with a one-time client key pair (e.g., ephemeral key pair) comprising a one-time client private key and a one-time client public key. The one-time client private key may be used (e.g., in conjunction with a server public key) to generate a request shared secret that is used to encrypt the request data to obtain the cipher text 918. The one-time client public key may be provided in the clear text 916 of the request message 900 as is or in an obfuscated form (shown as one-time client pub key 906 in FIG. 9) so that the server computer can decrypt the message using the client public key (e.g., in conjunction with a server private key).

The request message 900 can also include other data discussed herein. For example, the clear text 916 of the request message 900 can include a header version 902 and a protected server key identifier 904 similar to those discussed above in FIG. 7. The request message 900 can additionally include encrypted protocol data 910 (e.g., cipher suite information, data mapping information, etc.) and encrypted payload data 912 (e.g., client authentication data). The authentication data 919 of the request message 900 can include one or more message authentication codes (MACs) 914 for the entire request data and/or portions thereof.

As shown in FIG. 9, the response message 920 includes a protected client key identifier 924 in the clear text 936 of the response message 920. The protected client key identifier 924 may have been received by the server computer in a previous request message similar to the request message 900. The inclusion of the protected client key identifier 924 allows the client computer to map the response message 920 to the corresponding request message (e.g., request message 900) and to select the appropriate client private key for decrypting the response message 920.

The response message 920 can also include other data discussed herein. For example, the clear text 936 of the response message 920 can include a header version 922 and a one-time server pub key 926 similar to those discussed above in FIG. 8. The cipher text 938 of the response message 920 can additionally include protocol data 928 and payload data 932. The protocol data 928 can include a protected server key identifier 930 that identifies the server private/public keys. The server private key is used to encrypt the response data to obtain the cipher text 938. The protected server key identifier 930 can be passed back to the server computer in a subsequent request message to enable the server computer to decrypt the request message. The server public key is provided (as one-time server pub key 926) as is or in an obfuscated form. The payload data 932 can include credential data provisioned to the client computer, application data, or any other suitable data intended for the client computer. The authentication data 939 of the response message 920 can include one or more message authentication codes (MACs) 934 for the entire response data and/or portions thereof.

III. Data Protection Methods

Embodiments protect protocol data used for encrypting/decrypting payload data separately from the payload data. Sensitive payload data can be encrypted using one or more payload encryption keys to generate encrypted payload data. Protocol data including a cipher suite used for encrypting the payload data can also be encrypted using one or more protocol encryption keys. The protocol encryption keys and the payload encryption keys can be established based on a key agreement. The encrypted protocol data and the encrypted payload data can be send in a message.

When the message is received, the protocol data decryption keys and the payload decryption keys can be derived based on the key agreement. The encrypted protocol data can be decrypted using the protocol decryption keys to obtain the protocol data (e.g., cipher suite). The encrypted payload data can be decrypted using the protocol data and the payload decryption keys.

In some cases, the payload data can include a plurality of payload elements, each can be individually encrypted using different encryption keys. In such cases, the encrypted payload elements can be decrypted as needed to improve data security.

In various implementations, the techniques discussed below can be combined with the methods for providing confidential key identification discussed above or implemented independently of each other.

A. Message Encryption Methods

Figure 10:
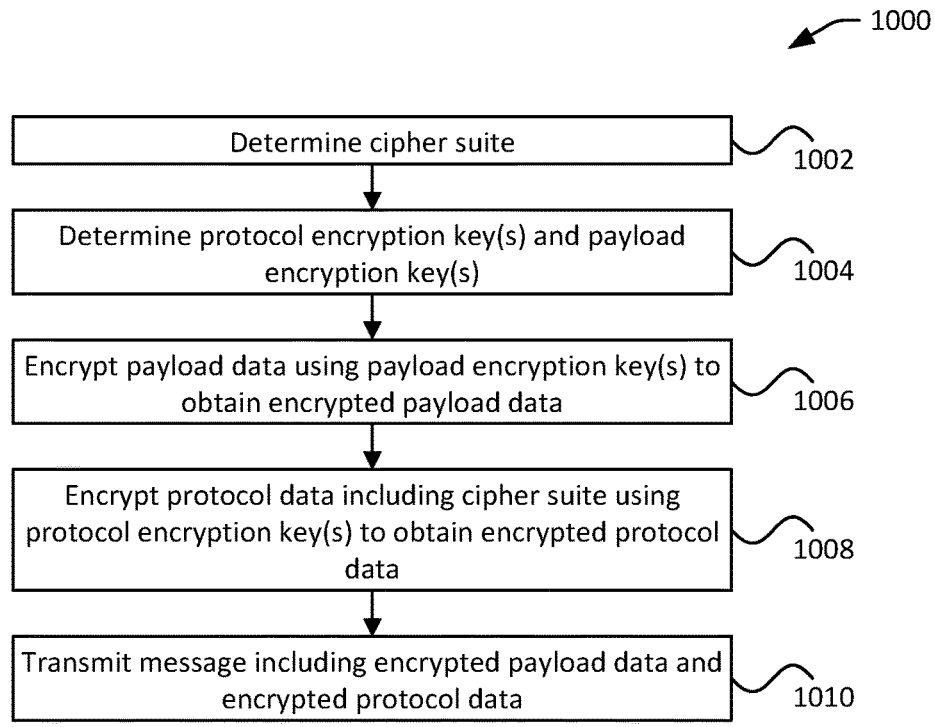
FIG. 10 illustrates an example process for encrypting a message, in accordance with some embodiments.

FIG. 10 illustrates an example process 1000 for encrypting a message, in accordance with some embodiments. The process 1000 can be implemented by a client computer to encrypt a request message to a server computer. Alternatively, the process 1000 can also be implemented by a server computer to encrypt a response message to a client computer.

At block 1002, a cipher suite for the message is determined. As discussed herein, a cipher suite defines various algorithms or parameters to be used for protecting communication between computers such as a mode of operation (e.g., Authenticated Encryption with Associated Data (AEAD)), a key size, a key exchange algorithm, and the like.

The cipher suite can be determined by a client computer or a server computer based on predetermined parameters such as hardware/software configurations and capabilities (e.g., operating system, memory, CPU), predetermined preferences (e.g. user preference), and the like. Additionally, the cipher suite can be determined based on a negotiation between a client computer and a server computer. For example, the client computer may send a list of cipher suites it supports to the server computer in a request. The cipher suites may be listed in the order of preference of the client computer. For example, the first cipher suite on the cipher suite list may be the most preferred by the client computer, the second cipher suite may be less preferred by the client computer than the first cipher suite, and so on. The request message may not include any payload data. Alternatively, the request message can include payload data that is encrypted using the preferred cipher suite. In response, the server computer can select a cipher suite from the list of cipher suites provided by the client computer (that may or may not be the client-preferred cipher suite) and include the selected cipher suite in a response message. The response message may not include any payload data. Alternatively, the response message can include payload data that is encrypted or otherwise encoded using the selected cipher suite.

At block 1004, one or more protocol encryption keys and one or more payload encryption keys are determined. The protocol encryption keys and the payload encryption keys can be determined based on one or more shared secrets between a sender and a receiver of the message, KDFs and/or key derivation parameters. The shared secrets can be derived using one or more private keys of the sender (e.g., a client private key or a server private key) and one or more public key of the receiver (e.g., a server public key or a client public key). The shared secrets can be derived using any suitable key agreement algorithm such as ECDH. In an embodiment, one private key may be combined with different public keys to derive different shared secrets. In another embodiment, different private keys may be combined with one public key to derive different shared secrets. The private and public keys may be one-time keys such as ephemeral keys or blinded static keys. A receiver public key may be obtained from a previous receiver message or from an out-of-band channel such as email, text, phone call, postal mail, or any other channel that is different than the current communication channel for request/response messages. In some cases, a receiver public key may be obtained from a third-party such as a certificate authority.

The protocol encryption keys and/or the payload encryption keys may be generated based on the cipher suite in addition to or instead of the shared secrets. For example, the cipher suite may indicate sizes of the keys to be generated and/or the key generation algorithms (e.g., KDFs).

The protocol encryption keys and/or the payload encryption keys may be generated from the same or different shared secret(s). In an example, a shared secret is used as an input to a key derivation function (KDF) to generate a long bit string, which is split into various shorter sub strings. The substrings can then be used to generate the protocol encryption keys and/or payload encryption keys. For instance, the first and second substrings may be used as the protocol encryption keys and the rest substrings may be used as payload encryption keys. In another example, different shared secrets may be used to with the same or different KDFs to generate different keys.

The protocol encryption keys and/or the payload encryption keys may be generated at substantially the same time or at different times. For example, the keys may be generated all at once based on a shared secret. In another example, some of the keys may be generated before others. In some cases, the keys may be generated on an "as-needed" basis, just before they are required for encryption operations.

The protocol encryption keys and/or the payload encryption keys may be generated independently of each other or based on previously-generated keys. For example, a protocol encryption key may be used as an input to generate another protocol encryption key or a payload encryption key. A payload encryption key may be used as an input to generate another payload encryption key.

At block 1006, payload data is encrypted using payload encryption key(s) to obtain encrypted payload data. Examples of payload data can include client identification or client credential data sent in a request message, credential data provisioned to a client computer in a response message from a server computer, application or transaction data in a transaction authorization message, and the like.

In some embodiments, payload data can be encrypted as a whole using a payload encryption key and an encryption algorithm indicated by the cipher suite. For instance, the payload data, the payload encryption key, and optionally a header (e.g., protected receiver key identifier, one-time sender public key) can be used as inputs into an AEAD function to produce a cipher text (encrypted payload data) and an authentication tag (message authentication code (MAC)).

In some other embodiments, the payload data can include a plurality of more than one portions (also referred to as "payload data elements" or "payload elements"). Each payload element may be individually encrypted using its own payload encryption key and/or encryption algorithm. The payload encryption keys and/or the encryption algorithms used by the various payload elements may be same or different. In some embodiments, the payload encryption keys and/or the encryption algorithms may be determined based on the cipher suite determined at block 1002.

At block 1008, protocol data including the cipher suite can be encrypted using the protocol encryption key(s) to obtain encrypted protocol data. Protocol data can refer to any information describing how to encrypt, decrypt, or otherwise process the payload data included in a message. The protocol data can include information about one or more cipher suites. For instance, the protocol data can include a cipher suite that is used or preferred to be used by a sender (e.g., a client computer or a server computer) of the message. Alternatively, the protocol data can include multiple cipher suites supported by the sender of the message.

Besides cipher suite information, protocol data can also include additional data such as data security descriptor data describing how individual data elements are encrypted. The descriptor data can include data-protocol mapping information. For example, for each of the payload element, the data-protocol mapping information can include detailed element-specific protocol information for the given payload element such as the data tag, encryption/decryption key identifier, encryption/decryption algorithm identifier, and the like. In some embodiments, the element-specific protocol information can optionally include a message authentication code associated with the payload element (e.g., as a result of applying AEAD to the payload element). The data-protocol mappings can be stored in a table, a list, a file, a database, or any other data structure or data storage that is accessible to the sender of the message.

The protocol data can also optionally include protected sender key identifier, such as described herein, to enable the mapping of asynchronous request and response messages. For example, a request message can include a protected client key identifier as part of its protocol data. A response message can include a protected server key identifier as part of its protocol data.

The protocol data can be encrypted using the protocol encryption keys determined at block 1004. In some embodiment, the protocol data may be encrypted using a single protocol encryption key (e.g., derived from a sender private key and a one-time receiver public key or a one-time sender private key and a receiver public key). In some other embodiments, different portions of the protocol data may be encrypted using different protocol encryption key and/or encryption algorithms. For instance, the data-protocol mappings of the protocol data may be encrypted using one or more mapping encryption keys and/or encryption algorithm(s) (e.g., AEAD) specific to the data-protocol mappings; whereas the cipher suite of the protocol data may be encrypted using one or more cipher suite encryption keys and a predetermined encryption algorithm (e.g., AES).

At block 1010, a message including the encrypted payload data and encrypted protocol data can be transmitted to a receiver of the message. For instance, the message can be a request message transmitted by a client computer to a server computer or a response message transmitted by a server computer to a client computer.

The encrypted payload data and the encrypted protocol data can be included in a cipher text portion of the message. The message may include additional information in a clear text portion of the message. For example, the message can include a protected receiver key identifier (e.g., a protected server key identifier in a request message or a protected client key identifier in a response message) in the clear text to allow the receiver to identify the receiver private key used to decrypt the message. The message can also include a one-time sender public key (e.g., a one-time client public key in a request message or a one-time server public key in a response message) that may be an ephemeral key or a blinded static key. The message can also include a header version indicating a protocol version that can be used by a receiver of the message, for example, to determine the suitable identifier encryption/decryption key for decrypting the protected receiver key identifier. The authenticity of some or all of the additional information, along with protocol data and payload data, can be protected using an authentication algorithm (e.g., AEAD) to generate a global MAC that is included in the message. In an example, the global MAC may be generated using a key the same as a protocol encryption key (e.g., cipher suite encryption key or mapping encryption key). In some embodiments, the global MAC can be computed from the payload element-specific MACs instead of or in addition to the encrypted payload elements. This provides flexibility in authenticating the message header when the payload data elements are scattered (e.g., not arranged in a consecutive manner) in a message or document. Payload element-specific MACs can also be included as part of the data-protocol mappings or at another suitable location within the message.

Figure 11:
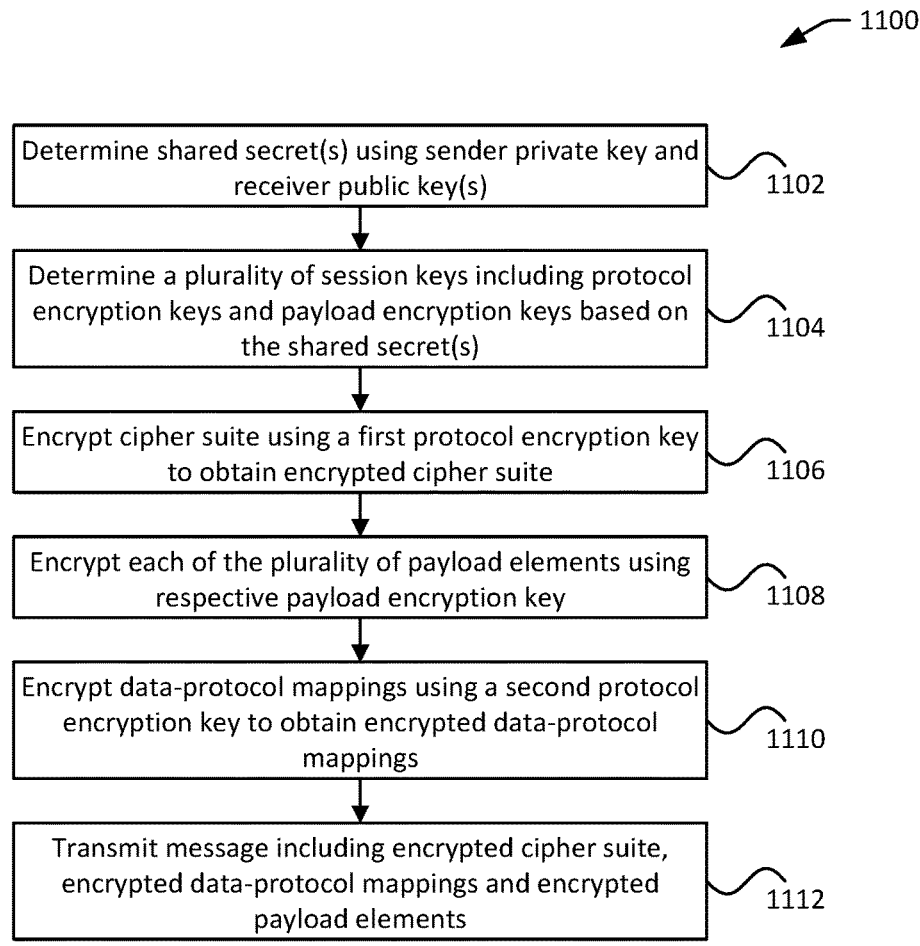
FIG. 11 illustrates another example process for encrypting a message, in accordance with some embodiments.

FIG. 11 illustrates another example process 1100 for encrypting a message, in accordance with some embodiments. The process 1100 can be implemented by a client computer to encrypt a request message to a server computer. Alternatively, the process 1100 can also be implemented by a server computer to encrypt a response message to a client computer.

At block 1102, one or more shared secrets are determined using one or more sender private keys and one or more receiver public keys. The shared secrets can be derived using any suitable key agreement algorithm such as ECDH. For a request message, the request shared secret may be determined using a client private key and a server public key. For a response message, the response shared secret may be determined using a server private key and a client public key. The private keys and/or public keys can be one-time keys (e.g., ephemeral keys or static blinded keys).

At block 1104, a plurality of session keys including protocol encryption keys and payload encryption keys are determined based on the shared secrets, KDFs and key derivation parameters, if any. In an embodiment, the shared secrets can be used as an input into a key derivation function to derive a bit string which is then split into a plurality of session keys. In some other embodiments, different shared secrets may be used to generate different session keys. For instance, shared secret A can be used to generate one or more session keys, shared secret B can be used to generate one or more other session keys, and so on.

In some embodiments, the key derivation function may additionally accept other inputs such as a receiver key identifier and a session identifier. The receiver key identifier may identifier a receiver public/private key pair or a receiver certificate, and may not be in a protected form. The session identifier may be determined based on a sender public key (e.g., a truncated sender public key).

The plurality of session keys can include protocol encryption keys used to encrypt the protocol data of the message and payload encryption keys used to encrypt the payload data of the message. The protocol encryption keys can include multiple keys for encrypting different protocol data. For instance, the protocol encryption keys can include a first protocol encryption key (e.g., a cipher suite encryption key) for encrypting the cipher suite. The protocol encryption keys can include a second protocol encryption key for encrypting the rest of the protocol data such as data-protocol mappings (e.g., a list of message authentication codes, payload encryption key identifiers, and/or encryption algorithm identifiers for the payload elements), sender key identifier, session identifier, cipher suite list (e.g., for a request message), and the like. In some embodiments, more than two protocol encryption keys may be used, where applicable. Similarly, the payload encryption keys can include multiple encryption keys, each for encryption a different portion (or payload element) of the payload data.

At block 1106, the cipher suite is encrypted using a first protocol encryption key (also referred to as the cipher suite encryption key) to obtain encrypted cipher suite. The cipher suite can be determined as described in block 1002 of process 1000 in FIG. 10. The cipher suite encryption key is selected from the plurality of session keys determined at block 1104. The cipher suite encryption key and/or the encryption algorithm used to encrypt the cipher suite are typically independent of the cipher suite itself. For instance, the cipher suite may specify the use of an AEAD encryption algorithm and a key size of 256 bits for encrypting the payload data. The cipher suite encryption key may be different key size (e.g. 128 bits) and the encryption algorithm for encrypting the cipher suite may be Advanced Encryption Standard (AES). In some embodiments, the encrypted cipher suite may be included as part of the clear text of the message. In other embodiments, the encrypted cipher suite may be included as part of the cipher text of the message.

At block 1108, each of a plurality of payload elements is encrypted using a respective payload encryption key. The payload encryption keys can be obtained from the plurality of session keys determined at block 1104. Payload data may be divided into a plurality of payload elements for a variety of reasons. For example, dividing the payload data into smaller individually protected data elements can reduce the risk of exposure of the entire payload data if one of the payload encryption keys is leaked. Alternatively, each of the data elements may be intended for access by a different entity or associated with a different level of security. Protecting the data elements with different keys and/or encryption algorithms can thus limit the access by such parties to the intended data elements, without unnecessarily exposing the other data elements.

The cipher suite encryption keys can be obtained from the plurality of session keys derived at block 1104 above. As such, the cipher suite encryption keys can be determined based on the shared secret(s) determined in block 1102. Alternatively or additionally, the cipher suite encryption keys may be determined based on one or more protocol encryption keys or other data.

Unlike the cipher suite encryption key which is typically independent of the cipher suite, the payload encryption keys and/or algorithms are typically dependent on the cipher suite. For instance, the cipher suite may specify the use of an AEAD encryption algorithm and/or a key size of 256 bits for the encryption of the payload data. Accordingly to the cipher suite, the payload encryption keys may have a key size of 256 bits, and/or the payload elements may be encrypted using an AEAD encryption function.

In some embodiments, the cipher suite may specify some but not all parameters governing the encryption of the payload elements. For example, the cipher suite may specify that an AEAD algorithm is to be used without specifying a key size. Alternatively, the cipher suite may specify only a key size without specifying the encryption algorithm. In such embodiments, the payload elements may be encrypted with element-specific encryption algorithm and/or payload encryption key size. Such element-specific encryption information may be included in the element-specific descriptor information (e.g., data-protocol mapping information) as part of the protocol data.

The encryption algorithm, key size, and/or other aspects associated with the encryption of a payload element may be determined based on a variety of factors such as a type of the payload element (e.g., a multimedia object or a text file), a size of the payload element, a level of sensitivity or security associated with the payload element, and other characteristics of the payload data. The factors may also include the characteristics of the intended receiving entity (e.g., user, computer, or process) for the payload element such as an identity, access control level, a network environment (e.g., secure or unsecure), hardware capabilities (e.g., network or computing resources), software configurations (e.g., operating system or applications), and the like.

At block 1110, data-protocol mappings can be encrypted using a second protocol encryption key to obtain encrypted data-protocol mappings. The second protocol encryption key is selected from the plurality of session keys generated at block 1104. In an embodiment, the second protocol encryption key is different than the first protocol encryption key that is used to encrypt the cipher suite at block 1106. The second protocol encryption key may be dependent on the cipher suite. For instance, the size of the second protocol encryption key may be as specified by the cipher suite. In an alternative embodiment, the second protocol encryption key may be the same as the first protocol encryption key and/or independent of the cipher suite.

The data-protocol mappings can include a plurality of mapping entries respectively corresponding to the plurality of payload elements. Each mapping entry may include a reference to a payload element (e.g., data tag), a key identifier that identifies the encryption/decryption key for the payload element, an algorithm identifier that identifies the cryptographic algorithm (e.g., encryption/decryption algorithm) for the payload element (e.g., AEAD), a message authentication code (MAC) for the payload element, and the like. The MAC may be generated as a result of applying the encryption algorithm (e.g., AEAD) to the payload element. Some or all of the above mapping entry data may be optional in different embodiments. For instance, a mapping entry may include only a MAC for a given payload element without including an encryption/decryption key identifier or an algorithm identifier. Thus, the data-protocol mappings may include only a list of data element MACs. As another example, a mapping entry may include an encryption/decryption key identifier and/or an algorithm identifier but may not include a MAC. For instance, the encryption algorithm (e.g., AES) may not generate a MAC when applied to the payload element.

In some embodiments, the second protocol encryption key can be used to encrypt other protocol data in addition to or instead of the data-protocol mappings. For instance, the other protocol data can include a protected sender key identifier, a session identifier, a cipher suite list, control bits, and the like. In other embodiments, the additional protocol data can be encrypted using additional protocol encryption keys that are different from the first or the second protocol encryption keys. In some cases, the encryption of the additional protocol data may depend on the cipher suite and/or the data-protocol mappings.

At block 1112, a message including the encrypted cipher suite, the encrypted data-protocol mappings, and the encrypted payload elements is transmitted. For instance, the message can be a request message transmitted by a client computer to a server computer or a response message transmitted by a server computer to a client computer.

The encrypted payload data and the encrypted protocol data can be included in a cipher text portion of the message. Alternatively, some of the encrypted protocol data (e.g., encrypted cipher suite) may be included in a clear text portion of the message. The message may include additional data such as a protected receiver key identifier (e.g., a protected server key identifier in a request message or a protected client key identifier in a response message) to allow the receiver to identify the receiver private key used to decrypt the message. The message can also include a one-time sender public key (e.g., a one-time client public key in a request message or a one-time server public key in a response message) that may be an ephemeral key or a blinded static key. The message can also include a header version indicating a protocol version that can be used by a receiver of the message, for example, to determine the suitable identifier encryption/decryption key for decrypting the protected server key identifier. The authenticity of some or all of these additional information may be included in the clear text portion or the cipher text portion of the message. Data included in the clear text portion of the message may not be encrypted but nonetheless authenticity/integrity protected (e.g., via AEAD). Thus, the message may not only include MACs for individual payload elements, but also one or more global MACs that cover the non-cipher text data included in the message.

In some embodiments, sensitive cryptographic information such as shared secrets and session keys can be erased (e.g., deleted, zeroized, or otherwise rendered inaccessible) soon after it is no longer required. The erasure of such sensitive information can occur, for example, after the encryption of the message data using the sensitive information. In other embodiments, some of such cryptographic information may be stored (e.g., in a secure element) for a period of time after it is used, for example, to allow processing of asynchronous messages.

B. Message Decryption Methods

Figure 12:
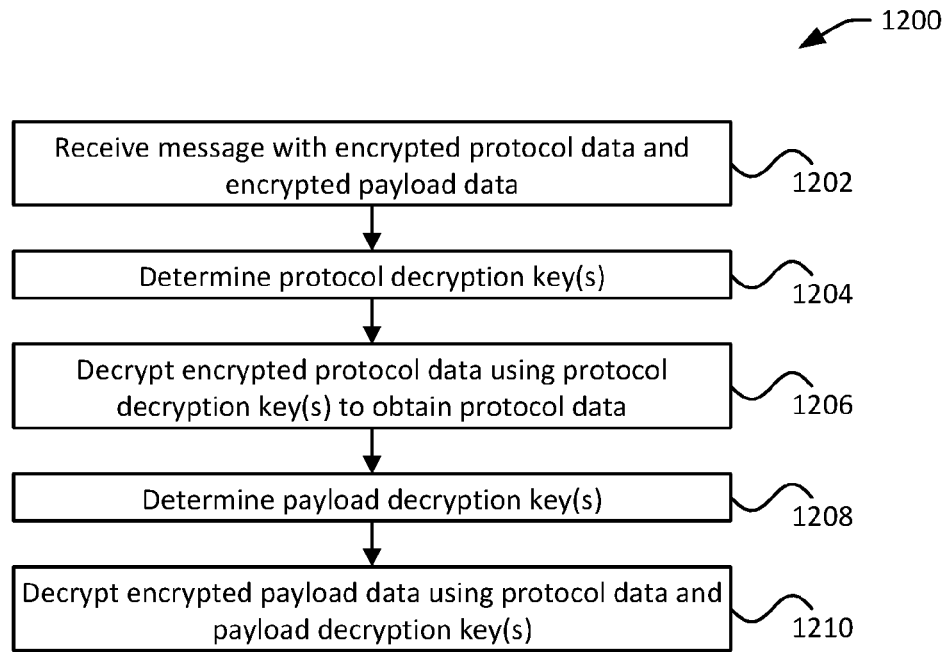
FIG. 12 illustrates an example process for decrypting a message, in accordance with some embodiments.

FIG. 12 illustrates an example process 1200 for decrypting a message, in accordance with some embodiments. The process 1200 can be implemented by a client computer to decrypt a response message from a server computer. Alternatively, the process 1200 can also be implemented by a server computer to decrypt a request message from a client computer.

At block 1202, a message including encrypted protocol data and encrypted payload data is received. In some embodiments, the message may have been generated by a message encryption method described in FIGS. 10-11 above.

At block 1204, one or more protocol decryption keys are determined. The protocol decryption keys may be the same as or different from the corresponding protocol encryption keys described in FIGS. 10-11. The protocol decryption keys can be determined based on one or more shared secrets between a sender and a receiver of the message, KDFs and key derivation parameters, if any. For instance, the shared secrets can be derived using one or more private key of the receiver (e.g., a client private key or a server private key) and one or more public key of the sender (e.g., a server public key or a client public key). The shared secrets can be derived using any suitable key agreement algorithm such as ECDH. The private and public keys may be one-time keys such as ephemeral keys or blinded static keys.

The receiver private key may be identified by a protected receiver key identifier included in the message itself. In some embodiments, the message may include a header version indicating a protocol version that can be used to determine an identifier decryption key for decrypting the protected receiver key identifier.

The sender public key(s) may be obtained from the message itself or from an out-of-band channel such as email, text, phone call, postal mail, or any other channel that is different than the current communication channel for request/response messages. In some cases, the sender public key(s) may be obtained from a third-party such as a certificate authority.

The protocol decryption keys may be generated from the same or different shared secret(s). In an example, a shared secret is used as an input to a key derivation function (KDF) to generate a bit string, which is split into various substrings. The substrings can then be used to generate the protocol decryption keys. In another example, different shared secrets may be used to with the same or different KDFs to generate different protocol decryption keys.

The protocol decryption keys may be generated at substantially the same time or at different times. For example, the protocol decryption keys may be generated all at once based on a shared secret. In another example, some of the keys may be generated before others. In some cases, the keys may be generated on an "as-needed" basis, e.g., just before they are required for decryption operations.

The protocol decryption keys may be generated independently of each other or based on previously-generated keys. For example, a first protocol decryption key may be used as an input to generate a second protocol decryption key. As another example, the first protocol decryption key may be used to decrypt an encrypted cipher suite. The cipher suite may specify a key size for a second protocol encryption key.

At block 1206, encrypted protocol data is decrypted using the protocol decryption key(s) to obtain protocol data. The protocol data typically includes a cipher suite as discussed above. Additionally, the protocol data may also include data-protocol mapping information, sender key identifier, sender session identifier, sender cipher suite list, and the like. In some embodiments, the entire encrypted protocol data may be decrypted using one protocol decryption key. In other embodiments, the protocol data may include multiple portions each individually encrypted. In such embodiments, each encrypted protocol data portion can be decrypted separately.

In some embodiments, the encrypted protocol data includes a first encrypted portion including the encrypted cipher suite and a second encrypted portion including data security descriptor (also referred to as data descriptor) information (e.g., including data-protocol mappings) and/or other protocol data. The first encrypted portion of the protocol data is decrypted using a first protocol decryption key (e.g., a cipher suite decryption key) to obtain the cipher suite. The second encrypted portion of the protocol data is decrypted using a second protocol decryption key to obtain the remaining protocol data. The decryption may occur in a predefined or an arbitrary order. For instance, in some cases, the decryption of the second encrypted portion (e.g., decryption algorithm or key size) may be determined based at least in part by the result of the decryption of the first encrypted portion (e.g., cipher suite). In these cases, the second encrypted portion must be decrypted after the decryption of the first encrypted portion. In some other cases, there may not be any dependencies between the different portions of the protocol data and the decryption of the protocol data may occur in an arbitrary order.

In some example, a protocol decryption key (e.g., cipher suite decryption key or mapping decryption key) may have been used to provide authenticity coverage for additional data in the message that is not included in the cipher text. As such, a global MAC included in the message may be validated to ensure authenticity and integrity of the message data.

At block 1208, one or more payload decryption key(s) are determined. The payload decryption keys may be the same as or different from the corresponding payload encryption keys described in FIGS. 10-11. The protocol decryption keys can be determined based on one or more shared secrets between a sender and a receiver of the message in a similar manner as described in block 1204. In some embodiments, the same shared secret is used to generate both the protocol decryption keys and the payload decryption keys. Alternatively, different shared secrets may be used to generate the protocol decryption keys and the payload decryption keys.

The payload decryption keys may be generated from the same or different shared secret(s). In an example, a shared secret is used as an input to a key derivation function (KDF) to generate a bit string, which is split into various substrings. The substrings can then be used to generate the payload decryption keys. In another example, different shared secrets may be used to with the same or different KDFs to generate different payload decryption keys. In some embodiments, the payload decryption keys may be generated based on the same shared secret(s) as the protocol decryption keys. For instance, a shared secret can be used by a KDF to generate a bit string which is then split into substrings corresponding to protocol decryption keys and protocol decryption keys.

The payload decryption keys may be generated at substantially the same time or at different times. For example, the payload decryption keys may be generated all at once based on a shared secret. In another example, some of the keys may be generated before others. In some cases, the keys may be generated on an "as-needed" basis, just before they are required for decryption operations. In some embodiments, the payload decryption keys may be generated at substantially the same time as or at different time than the protocol decryption keys.

The payload decryption keys may be generated independently of each other or based on previously-generated keys. For example, a first payload decryption key may be used as an input to generate a second payload decryption key. As another example, the first payload decryption key may be used to decrypt a piece of data (e.g., a key derivation parameter), which is then used as input to generate a second payload decryption key. In some embodiments, the generation of the payload decryption keys may be dependent on the information decrypted using the protocol decryption keys such as a cipher suite. For instance, the cipher suite may specify the size of the payload decryption keys and/or key derivation functions.

At block 1210, encrypted payload data is decrypted using the protocol data and the payload decryption key(s). In some embodiments, encrypted payload data can be decrypted as a whole using a decryption algorithm indicated by the cipher suite and a protocol decryption key determined at block 1204. In some embodiments, the decryption of the payload data includes verifying a MAC of the payload data. The MAC may be included as part of the protocol data.

In some other embodiments, the encrypted payload data can include a plurality of more than one encrypted payload elements. Each encrypted payload element may be individually decrypted using its corresponding payload decryption key and decryption algorithm. As discussed above, dividing the payload data into smaller individually protected data elements can reduce the risk of exposure of the entire payload data. Additionally, each of the data elements may be intended for access by a different entity or associated with a different level of security. Protecting the data elements with different keys or algorithms can thus limit the access by such parties the intended data elements, without unnecessarily exposing the other data elements.

The payload decryption keys, decryption algorithms, and optionally MACs used for decrypting the payload elements may be determined based at least in part on the protocol data determined at block 1208. As an example, the cipher suite can indicate the key size and/or decryption algorithm to be used. As another example, the data-protocol mappings can indicate, for each payload element, the corresponding data tag, decryption key, decryption algorithm, and/or MAC to be used for decrypting the encrypted payload element and/or for validating the decrypted result.

The decrypted payload data can be processed in any suitable manner by the receiver of the message. For instance, the message may be a provisioning response message from a server computer and the payload data of the message may include credential data (e.g., PAN or token, limited use keys) that is provisioned to a client computer. The client computer may subsequently use the credential data to conduct transactions. As another example, the message may be a request message from a client computer to a server computer and the payload data of the message may include authentication or identification data of the client computer. The payload data may be used by the server computer to authenticate the client computer and/or to generate a corresponding response.

In some embodiments, some or all of the decrypted payload data may be re-encrypted using a different encryption key (e.g., shared or private), stored in a data storage, and/or transmitted to another entity.

Figure 13:
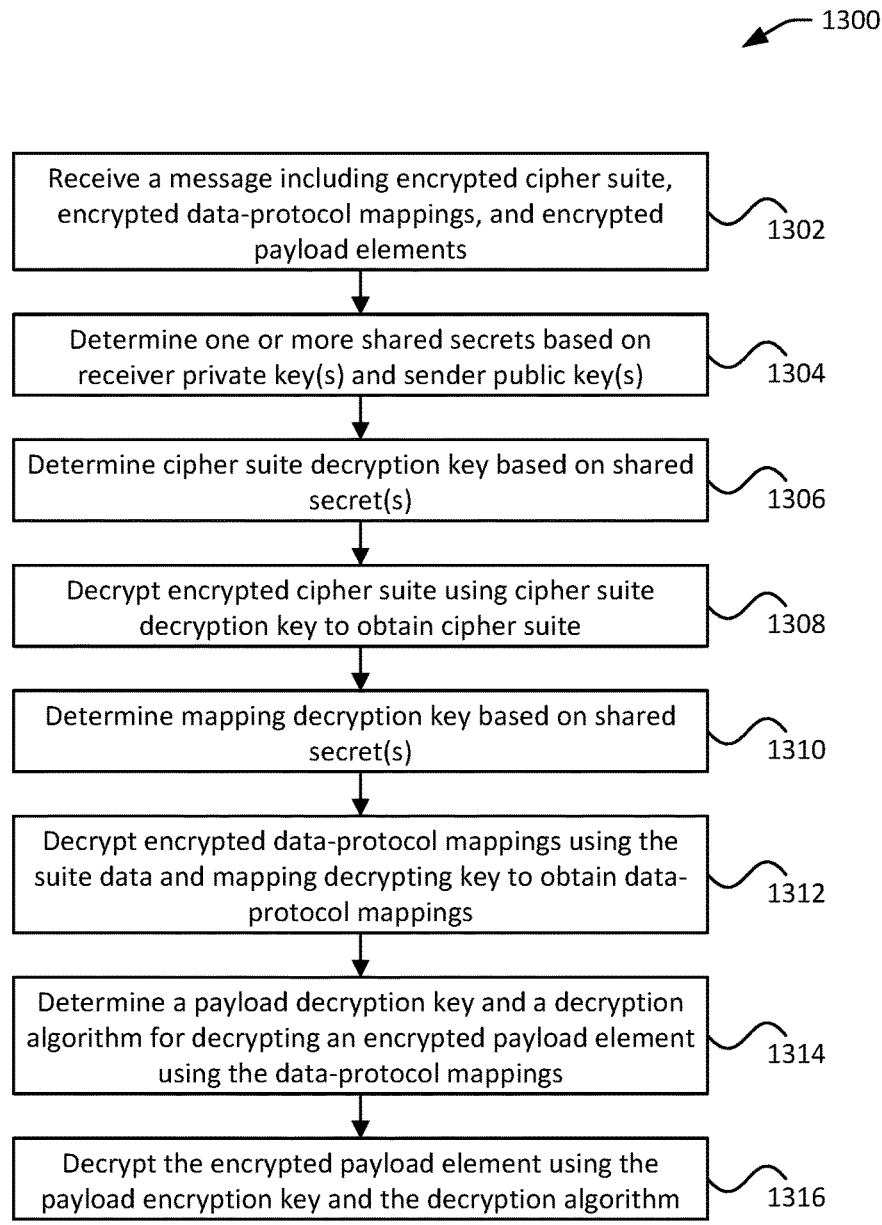
FIG. 13 illustrates another example process for decrypting a message, in accordance with some embodiments.

FIG. 13 illustrates another example process 1300 for decrypting a message, in accordance with some embodiments. The process 1300 can be implemented by a client computer to decrypt a response message from a server computer. Alternatively, the process 1300 can also be implemented by a server computer to decrypt a request message from a client computer.

At block 1302, a message is received including encrypted cipher suite, encrypted data-protocol mappings, and encrypted payload elements. The message may also include other data such a one-time sender public key (e.g., ephemeral or blinded static key), protected receiver key identifier, header version, and the like.

At block 1304, one or more shared secrets are determined based on one or more receiver private key(s) and one or more sender public key(s). In an embodiment, one private key may be combined with different public keys to derive different shared secrets. In another embodiment, different private keys may be combined with one public key to derive different shared secrets. In some embodiments, a receiver private key may be identified by a protected receiver key identifier included in the message itself. The message may include more than one protected receiver key identifiers each identifying a different receiver private key. For instance, the message may include a header version indicating a protocol version that can be used to determine an identifier decryption key for decrypting the protected receiver key identifier. In some embodiments, the header version can be used to select a default key pair from a plurality of default key pairs. The selected default key pair comprises a default private key and a default public key. The identifier decryption key may be derived based on a point multiplication of the default private key and the default public key.

The sender public key may be obtained from the message itself. For instance, the sender public key may be stored in a clear text and/or a cipher text of the message. If stored in the clear text, the sender public key is typically obfuscated to provide security. In some cases, the sender public key may be obtained from a previous message or from an out-of-band channel such as email, text, phone call, postal mail, or any other channel that is different than the current communication channel for request/response messages. In some cases, the sender public key may be obtained from a third-party such as a certificate authority.

At block 1306, a cipher suite decryption key is determined based on the share secret or secrets determined above. For example, a shared secret can be used as an input into a KDF to generate a bit string, a portion of which (e.g., the first 128 bits) can be used as the cipher suite decryption key. The cipher suite decryption key is a protocol decryption key. The rest of the string may be split to generate other protocol decryption keys (e.g., mapping decryption key) or payload decryption keys.

At block 1308, the encrypted cipher suite is decrypted using the cipher suite decryption key to obtain the cipher suite. The cipher suite decryption key and/or the decryption algorithm used to decrypt the cipher suite are typically independent of the cipher suite itself. For instance, the cipher suite may specify the use of an AEAD encryption algorithm and a key size of 256 bits. The cipher suite decryption key may be different key size (e.g. 128 bits) and the decryption algorithm for decrypting the cipher suite (e.g., Advanced Encryption Standard (AES)) may be different than that specified by the cipher suite. In some embodiments, the encrypted cipher suite may be included as part of the clear text of the message. In other embodiments, the encrypted cipher suite may be included as part of the cipher text of the message.

At block 1310, mapping decryption key is determined using the shared secret(s) determined at block 1304. The mapping decryption key is a protocol decryption data that is used to decrypt additional protocol data such as the data-protocol mappings below. The mapping decryption key is typically different from the cipher suite decryption key. However, in some cases, the mapping decryption key may be the same as the cipher suite decryption key. In some embodiments, the mapping decryption key can be determined using the same shared secret that is used to determine the cipher suite decryption key. In other embodiments, the mapping decryption key may be determined using a different shared secret than that used to determine the cipher suite decryption key. The mapping decryption key can be determined at substantially the same time or at a different time than the cipher suite decryption key.

In some embodiments, the mapping decryption key may be determined based at least in part on the cipher suite. For instance, the size of the mapping decryption key and/or the KDF may be specified by the cipher suite. Accordingly, a section of a bit string with a corresponding size is selected as the mapping decryption key. The bit string may be an output string of a KDF based on a shared secret. In some cases, other sections of the same output string may be used for the cipher suite decryption key and/or the payload decryption keys. In other embodiments, the mapping decryption key may not be based on the cipher suite.

At block 1312, the encrypted data-protocol mappings data is decrypted using the cipher suite and the mapping decryption key to obtain data-protocol mappings.

In some embodiments, the decryption algorithm used to decrypt the data-protocol mappings may be determined based at least in part on the cipher suite. For instance, the cipher suite may specify the use of an AEAD encryption algorithm and/or a key size of 256 bits. Accordingly, the payload encryption keys may have a key size of 256 bits, and/or the payload elements may be encrypted using an AEAD encryption function.

The data-protocol mappings can include a plurality of mapping entries respectively corresponding to a plurality of payload elements. Each mapping entry may include a reference to a payload element (e.g., data tag), a key identifier that identifies the encryption/decryption key for the payload element, an algorithm identifier that identifies the cryptographic algorithm (e.g., encryption/decryption algorithm) for the payload element (e.g., AEAD), a message authentication code (MAC) for the payload element, and the like. The MAC may be generated as a result of applying the encryption algorithm (e.g., AEAD) to the payload element. Some or all of the above mapping entry data may be optional in different embodiments. For instance, a mapping entry may include only a MAC for a given payload element without including an encryption/decryption key identifier or an algorithm identifier. Thus, the data-protocol mappings may comprise a list of MACs. As another example, a mapping entry may include an encryption/decryption key identifier and/or an algorithm identifier but may not include a MAC. For instance, the encryption algorithm (e.g., AES) may not generate a MAC when applied to the payload element.

In some embodiments, the data-protocol mappings can also additional protocol data such as a protected sender key identifier, a session identifier, a cipher suite list, control bits, and the like. In other embodiments, the additional protocol data can be encrypted using a different protocol encryption key.

At block 1314, a payload decryption key and a decryption algorithm are determined, using the data-protocol mappings, for decrypting an encrypted payload element.

One or more payload decryption keys may be determined based on the shared secret(s) determined at block 1304. The payload decryption keys may be generated using the same shared secret(s) and/or the same KDF as for the protocol decryption keys (e.g., cipher suite key and/or mapping decryption key) described above. In an embodiment, a long bit string is generated by a KDF using a shared secret. The long bit strings is split into a plurality of smaller sub strings, each corresponding to a payload decryption key. The long bit string may also be used to generate the cipher suite decryption key and/or mapping decryption key in some embodiments.

In some embodiments, the generation of the payload decryption keys may be determined by the data-protocol mappings. For instance, the data-protocol mappings may indicate, for each of the payload elements, the size of the corresponding decryption key. Based on this information, consecutive segments of bit strings may be selected from a longer bit string (e.g., generated by a KDF using a shared secret) and used as the payload decryption keys, wherein the length of each segment corresponds to the size of the corresponding payload decryption key as indicated by the data-protocol mappings. In some embodiments, the payload decryption keys generated all at once. In some other embodiments, the payload decryption keys may be generated on an "as-needed" basis, e.g., just before they are required for decryption particular the corresponding payload elements.

A payload decryption key and/or a decryption algorithm to be used for a particular payload element can be identified based at least in part on the data-protocol mappings. For instance, the data-protocol mapping entry for the payload element can be retrieved (e.g., using a data tag). The data-protocol mapping entry may include a data tag associated with a data element, a decryption key identifier that identifies the payload decryption key, and/or a decryption algorithm identifier that identifies the decryption algorithm for the payload element. In an implementation, payload decryption keys are stored in a list, an array, or other suitable data structure. The decryption key identifier may be an index that points to a location in such a data structure where the corresponding payload decryption key is stored. The algorithm identifier may identify the algorithm by name. Alternatively, the algorithm identifier may include an index that points to a location in a list, an array, or other suitable data structure where the corresponding algorithm name or code for the algorithm is stored.

In some alternative embodiments, a decryption key identifier and/or algorithm identifier may not be explicitly included in the data-protocol mappings. For instance, the decryption key for a payload element may be identified implicitly based on the position of the payload element relative to other payload elements. For instance, the first payload decryption key in an ordered list of payload decryption keys may correspond to the first payload element, the second payload decryption key in the ordered list of payload decryption keys may correspond to the second payload element, and so on. The same may be implemented for the algorithm identifiers.

The data-protocol mappings can optionally include a MAC for each payload element that may be validated during decryption of the encrypted payload element. As an example, an encrypted payload element, the corresponding payload decryption key, and corresponding MAC may be provided to the corresponding decryption function (e.g., AEAD) to obtain the payload element in plain text, or an error if the MAC does not match the encrypted payload element.

In some embodiments, the payload decryption keys and/or algorithms for some or all of the payload elements are determined by the cipher suite in addition to or instead of by the data-protocol mappings. In an embodiment, a tiered approach may be used, where the data-protocol mapping is searched to determine element-specific decryption key and/or algorithm used for decrypting a particular payload element. If not found, then a global decryption key and/or default decryption algorithm specified by the cipher suite may be used to decrypt the payload element.

In some embodiments, blocks 1314 and 1316 can be repeated for more than one encrypted payload elements included in the message, for example, in an "as needed" basis. The protocol data may include identifications of the intended recipients, accessibility (e.g., required access right), and other contextual information about some or all of the payload elements. In some embodiments, the decryption of a payload element may depend on the decryption of another payload element. For instance, data obtained from decryption of one encrypted payload element may be used to decrypt another encrypted payload element. In some embodiments, a decrypted payload element may be re-encrypted using a different key (e.g., a local encryption key) before being stored or transmitted.

In some embodiments, sensitive cryptographic information such as shared secrets and session keys can be erased (e.g., deleted, zeroized, or otherwise rendered inaccessible) soon after it is no longer required. The erasure of such sensitive information can occur, for example, after the decryption of the message data using the sensitive information. In other embodiments, some of such cryptographic information may be stored (e.g., in a secure element) for a period of time after it is used, for example, to allow processing of asynchronous messages.

Figure 14:
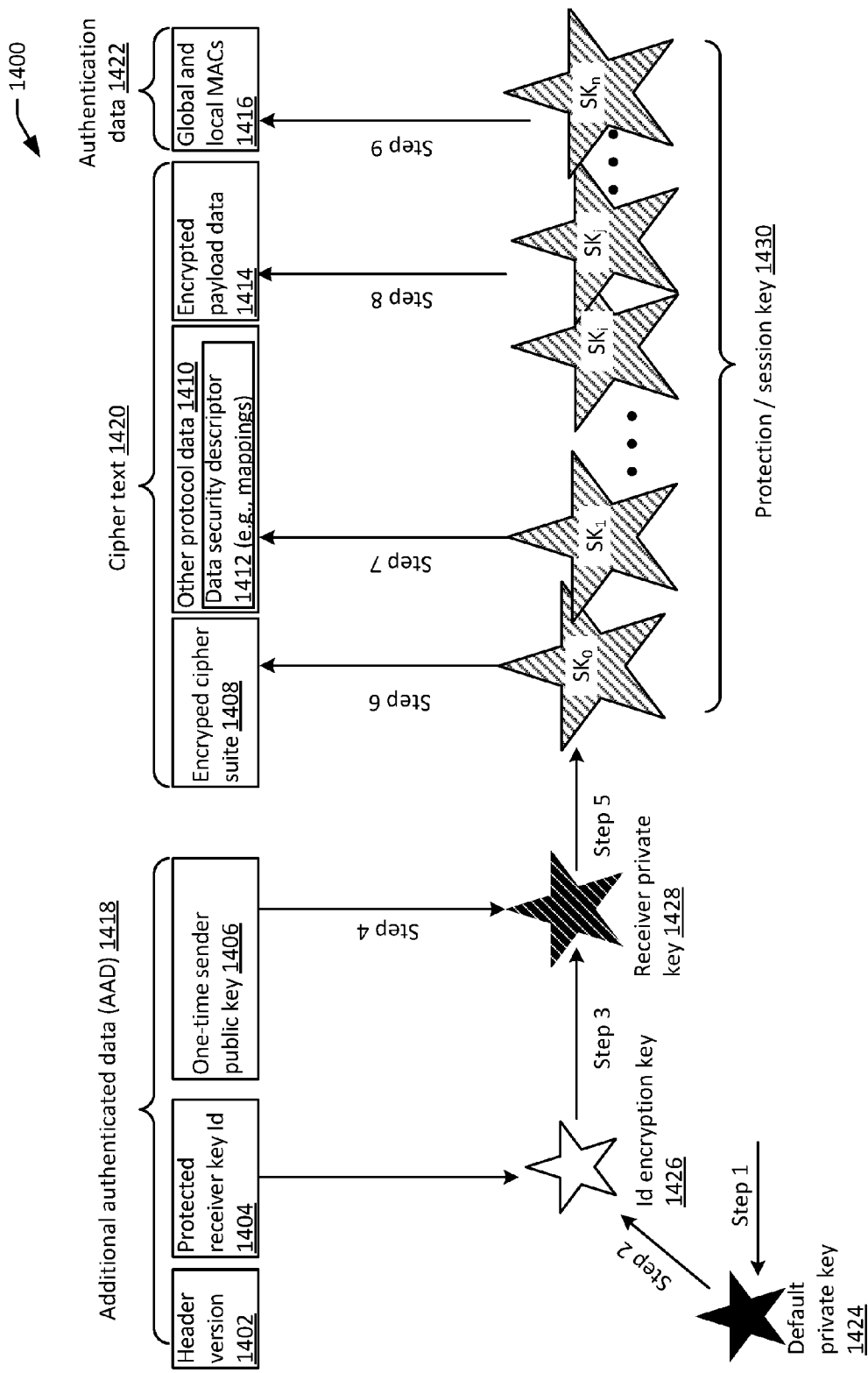
FIG. 14 illustrates another example process for decrypting a message, in accordance with some embodiments.

FIG. 14 illustrates another example process for decrypting a message 1400, in accordance with some embodiments. The message 1400 may be a request message received by a server computer from a client computer or a response message received by a client computer from a server computer.

The message 1400 may include additional authenticated data (AAD) 1418, a cipher text 1420, and authentication data 1422. The AAD 1418 can include a header version 1402, one or more protected receiver key identifiers 1404, and one or more one-time sender public keys 1406. The header version 1402 may indicate a protocol version used by the current message. In some embodiments, the header version may not be included in the AAD 1418, but instead remain in the clear. The protocol version may dictate the data format of the message. The protected receiver key identifiers 1404 may be protected server key identifiers for a request message and protected client key identifiers for a response message. Each protected receiver key identifier can be used to identify a corresponding receiver private key. The one-time sender public keys 1406 may include one or more one-time client public keys for a request message or one or more one-time server public keys for a response message. The one-time sender public keys 1406 can be ephemeral keys or blinded or obfuscated static keys. Data included in the AAD may not be encrypted but may be obfuscated and integrity protected (e.g., via a globally applied AEAD). For instance, the one-time sender public keys 1406 may be obfuscated. The protected receiver key identifier may be included in the protected form (e.g., encrypted). The header version 1402 may be provided in the clear and not obfuscated or encrypted.

The cipher text 1420 can include encrypted payload data 1414 and encrypted protocol data including encrypted cipher suite 1408 and other encrypted protocol data 1410 including data security descriptor 1412. The data security descriptor 1412 can include data-protocol mappings such as described herein.

The authentication data 1422 can include one or more message encryption codes (e.g., AEAD MACs) for the entire message and/or for various portions of the message. For example, the authentication data 1422 can include a global MAC that protects the AAD 1418, and/or a plurality of local MACs, each covering a different portion of the message such as a different payload element of the payload data.

Once the message 1400 is received by a receiver (e.g., a server computer or a client computer), the following example steps may be taken by the receiver decrypt the message, in accordance with embodiments.

At step 1, a default private key 1424 of the receiver can be determined. The determination may be based on the header version 1402. For instance, there may be a plurality of default private keys associated with different protocol versions. The header version 1402 can indicate the protocol version of the message and thereby used to select the corresponding default private key.

At step 2, an identifier decryption key 1426 can be derived based on the default private key 1424. For instance, the identifier decryption key 1426 may be derived based on a point multiplication of the default private key 1424 and a default public key associated with the default private key 1424. The identifier decryption key 1426 can be used to decrypt one or more protected receiver key identifiers 1402 to obtain one or more receiver key identifiers (not shown).

At step 3, the one or more receiver key identifiers are used to retrieve the corresponding receiver private keys 1428. In some cases where a receiver key identifier is invalid (e.g., a random identifier that is not associated with any receiver private key), the default private key or some other suitable private key may be used instead.

At step 4, one or more shared secrets are generated based on the one or more receiver private keys 1428 and the one or more one-time sender public keys 1406 (e.g., using ECDH).

At step 5, the shared secrets can be used to derive one or more protection keys 1430 (also referred to as session keys) such as $SK_0$, $SK_1$, ... $SK_n$ using KDFs and other key derivation parameters, if any. The protection keys 1430 can include protocol decryption keys and payload decryption keys. In some cases, some or all of the decryption keys 1430 may be the same as the encryption keys used to encrypt the data in the message. In some other cases, the decryption keys may be different than the encryption keys.

At step 6, a first protection key ($SK_0$) is used to decrypt the encrypted cipher suite 1408 to obtain a cipher suite. The first protection key and the decryption algorithm for decrypting the cipher suite may be independent of the cipher suite.

At step 7, a second protection key ($SK_1$) is used to decrypt the other encrypted protocol data 1410 to obtain additional protocol data such as the data security description (e.g., data-protocol mappings). The decryption of the encrypted protocol data 1410 may be performed according to the cipher suite. For instance, the cipher suite may indicate the decryption algorithm to be used (e.g., AEAD).

At step 8, the other protection keys (e.g., $SK_3$ to $SK_n$) and the protocol data are used to decrypt the encrypted payload data 1414. For instance, the encrypted payload data can include a plurality of independently-encrypted data elements. The data-protocol mappings can be used to determine now to decrypt and/or validate each encrypted data element by specifying the payload decryption key, decryption algorithm, and/or message authentication code to use. For example, in one example, a first encrypted payload element may be decrypted using a first payload decryption key (e.g., $SK_i$), whereas a second encrypted payload element may be decrypted using a second payload decryption key (e.g., $SK_j$). In some cases, some or all of the encrypted payload elements may not be decrypted, or may be decrypted at different times.

In some cases, a payload element may be decrypted depending on a type of the data stored in the payload element. For example, a receiver (e.g., server computer or client computer) can decide to decrypt only certain data based on a particular operation to be performed. In this manner, only the data that is needed is decrypted, and the unneeded data can stay encrypted, thereby avoiding potential discovery when the data is in clear text, even if for only a short period. In an example, the type of data may be indicated in the data security descriptor as part of the protocol data.

At step 9, the authentication data (e.g., MACs) 1422 can be validated using the protection keys and/or the decrypted data. In some embodiments, the validation of a MAC can occur during, before, or after the decryption of the data for which the MAC provides protection.

C. Data Protection for HTTP Messages

Techniques discussed herein can be used to protect sensitive data transmitted in HTTP messages. In some embodiments, sensitive payload data can be encrypted using the encryption methods described herein to generate encrypted payload data and encrypted protocol data. The encrypted payload data and encrypted protocol data can be included in an HTTP message (e.g., an HTTP request message or an HTTP response message) and transmitted. Conversely, an HTTP message containing encrypted protocol data and encrypted payload data can be decrypted using the decryption methods described herein to recover the sensitive payload data. In various embodiments, sensitive payload data can include a file, a data object, a data stream, or any other form of data.

While embodiments in the following discussion utilize JavaScript Object Notion (JSON) and JSON Web Encryption (JWE) to implement various aspects, it is understood any other suitable data format and/or message encryption schemes may be used in alternative embodiments.

Figure 15:
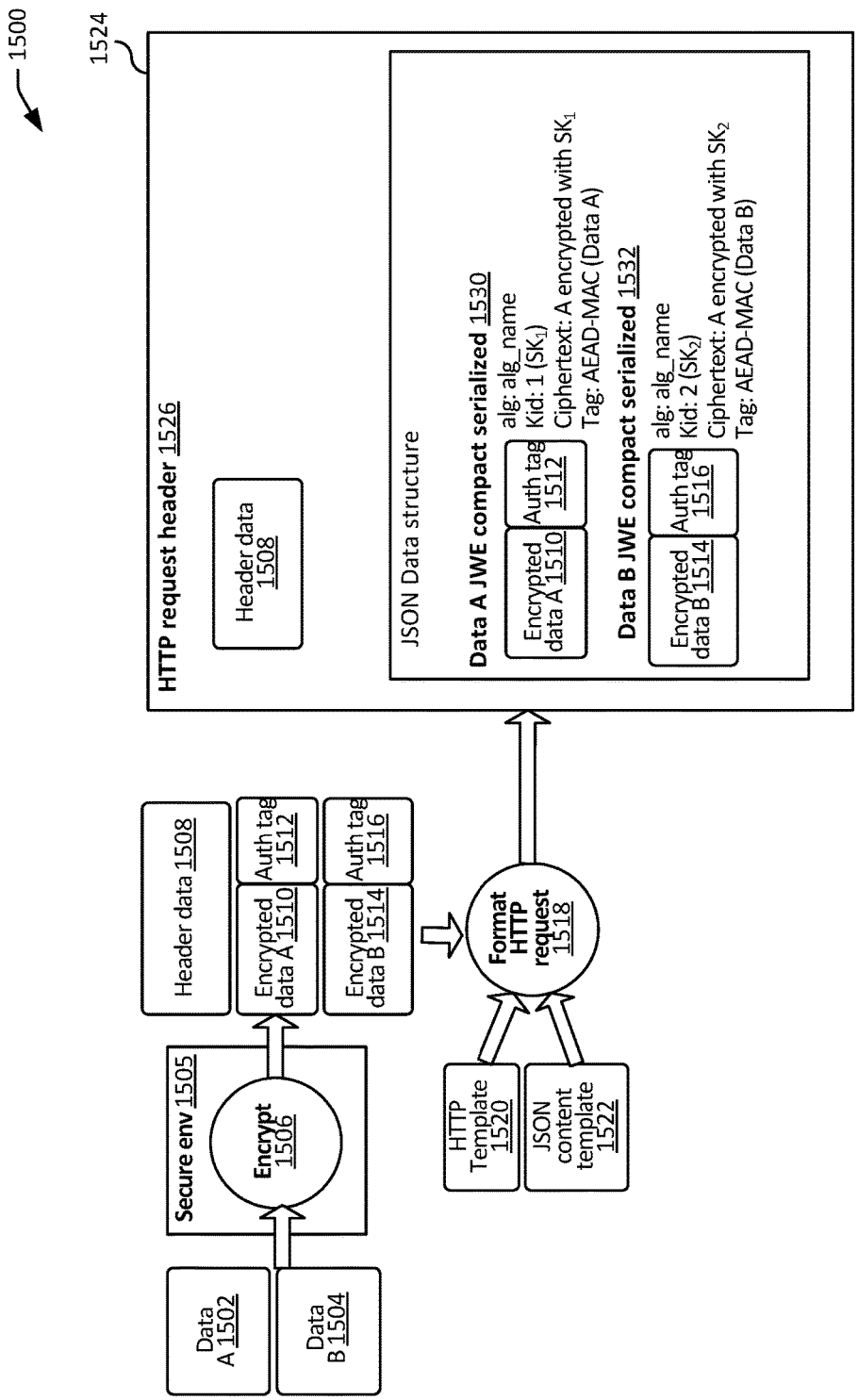
FIG. 15 illustrates an example process for generating an HTTP request message, in accordance with some embodiments.

FIG. 15 illustrates an example process 1500 for generating an HTTP request message, in accordance with some embodiments. The process 1500 can be implemented by a sender of the HTTP request message such as a client computer.

As illustrated, sensitive data or key A 1502 (e.g., PAN information) and sensitive data or key B 1504 (e.g., access token hash) can be encrypted by an encryption service or module 1506 to generate encrypted data including encrypted data A 1510 and its associated authentication tag 1512 (e.g., a MAC), encrypted data B 1514 and its associated authentication tag 1516 (e.g., a MAC), and header data 1508 that can include key agreement information and/or encryption protocol information (e.g., cipher suite). In some cases, the data to be encrypted may be already encrypted. For example, a LUK may be encrypted with a local DES key. In such cases, the encryption service 1506 may first decrypt the locally encrypted data (e.g., using the local DES key) before re-encrypting it with a protection key (e.g., based on a shared secret) to generate the encrypted data.

The encryption service or module 1506 is preferable executed in a relatively secure environment 1505. The secure environment can be provided by hardware, software, or a combination of both. For instance, the secure environment can be provided by a hardware security module (HSM) and/or application programming interface (API). Operations of an example encryption service or module are discussed with respect to FIG. 19.

The above output of the encryption service 1506 can be processed to generate an HTTP request message 1524 that is formatted according to one or more templates such as one or more HTTP templates 1520 and/or one or more JSON content templates 1522. In an embodiment, the output of the encryption service 1506, the HTTP templates 1520, the JSON content templates 1522 can be provided as inputs to a formatting service or module 1518, which generates a properly formatted HTTP request message 1524. In an embodiment, the HTTP request message 1524 may be formatted according to the JWE specification.

The HTTP request message 1524 includes an HTTP request header 1526 that includes the header data 1508. The header data 1508 may be encoded or obfuscated (e.g., using Base64URL encoding). Exemplary header data 1508 can include public or private key reference (e.g., certificate sequence number), one-time public key, key agreement parameters, list of MACs for payload data, and a global MAC.

The HTTP request message 1524 also includes the encrypted data A 1510 and the encrypted data B 1514 in the HTTP request header 1526 or other suitable portions of the request message. For instance, in an embodiment, the HTTP request message 1524 can include a JWE serialization for data A 1530 and a JWE serialization for data B 1532 in the HTTP request header or another portion of the HTTP request. The JWE serializations can be either JWE JSON serializations or JWE JSON serializations. Each JWE serialization can include a header, a cipher text, and an authentication tag represented in name/value pairs. Data may be Base64URL encoded prior to being included in the JWE serialization. The header of a JWE serialization can include protocol data identifying the encryption algorithm and the encryption key used to encrypt the specific data. For instance, the header for data A JWE serialization 1530 can include identification of the encryption algorithm (e.g., "alg: alg_name") and the encryption key (e.g., "Kid: 1", referring to encryption key $SK_1$) that are used to encrypt data A. The header for data B JWE serialization 1532 can include identification of the encryption algorithm (e.g., "alg: alg_name") and the encryption key (e.g., "Kid: 2", referring to encryption key $SK_2$) that are used to encrypt data B. The cipher text for data A JWE serialization 1530 can include the encrypted data A 1510. The cipher text for data B JWE serialization 1532 can include the encrypted data B 1514. The authentication tag for data A JWE serialization 1530 can include the authentication tag 1512. The authentication tag for data B JWE serialization 1532 can include the authentication tag 1516.

Figure 16:
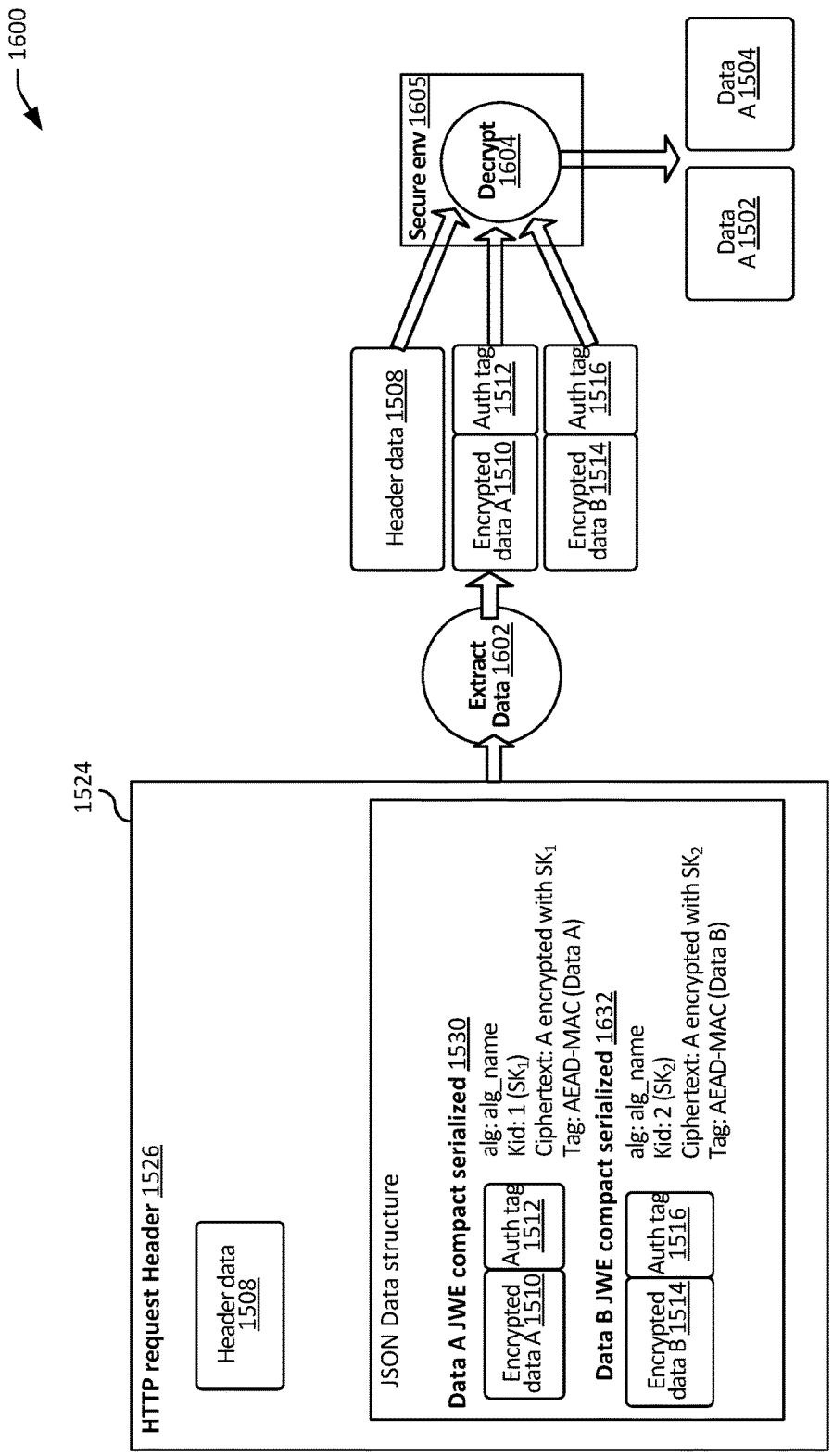
FIG. 16 illustrates an example process for processing an HTTP request message, in accordance with some embodiments.

FIG. 16 illustrates an example process 1600 for processing an HTTP request message, in accordance with some embodiments. The process 1600 can be implemented by a receiver of the HTTP request message such as a server computer.

As illustrated, an HTTP request message 1524 such as described in FIG. 15 can be processed by a parsing module 1602 to extract header data 1508, the encrypted data A 1510 and the associated authentication tag 1512, and the encrypted data B 1514 and the associated authenticated tag 1516. The parsing module may perform Base64URL decoding, where necessary.

The extracted data can be fed into a decryption service or module 1604 to obtain the original sensitive data such as sensitive data A 1502 (e.g., PAN information in clear text) and sensitive data B 1504 (e.g., access token hash in clear text).

The decryption service or module 1604 is preferable executed in a relatively secure environment 1605. The secure environment can be provided by hardware, software, or a combination of both. For instance, the secure environment can be provided by an HSM and/or API. Operations of an example decryption service or module 1604 are discussed with respect to FIG. 20.

Figure 17:
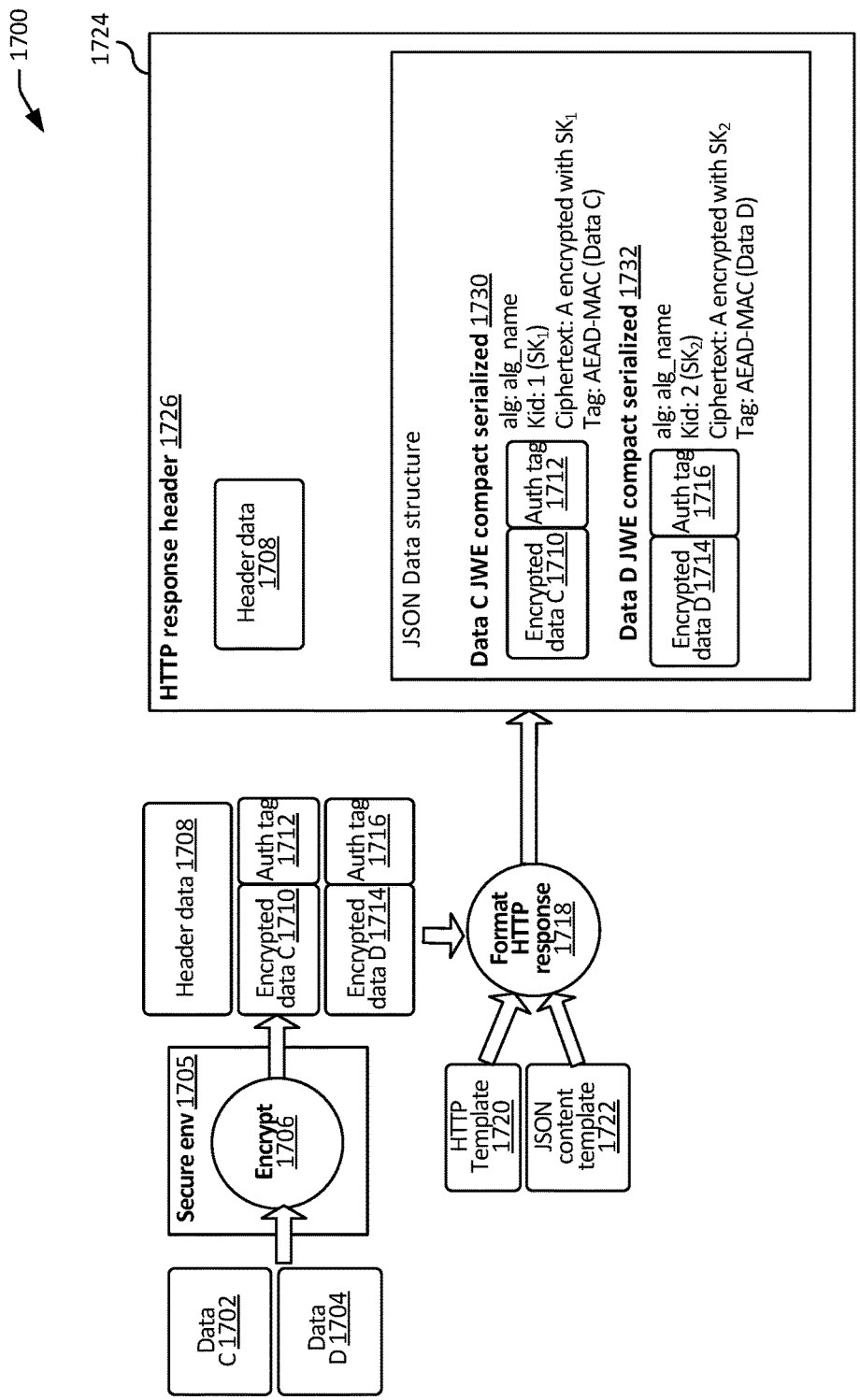
FIG. 17 illustrates an example process for generating an HTTP response message, in accordance with some embodiments.

FIG. 17 illustrates an example process 1700 for generating an HTTP response message, in accordance with some embodiments. The process 1700 can be implemented by a sender of the HTTP response message such as a server computer. Aspects of the process 1700 may be similar to the process 1500 for encrypting data for an HTTP request message described in FIG. 15.

In a process similar to the encrypting of data A and data B in process 1500, sensitive or key data C 1702 (e.g., limited use key (LUK)) and sensitive data or key D 1704 (e.g., token parameters) can be encrypted by an encryption service or module 1706 to generate encrypted data including encrypted sensitive data C 1710 and its associated authentication tag 1712 (e.g., a MAC), encrypted sensitive data D 1714 and its associated authentication tag 1716 (e.g., a MAC), and header data 1708 that can include key agreement information and/or encryption information (e.g., cipher suite). In some cases, the data to be encrypted may be already encrypted. For example, a LUK may be encrypted with a local DES key. In such cases, the encryption service 1706 may first decrypt the locally encrypted data (e.g., using the local DES key) before re-encrypting it with a protection key (e.g., based on a shared secret) to generate the encrypted data.

The encryption service or module 1706 is preferable executed in a relatively secure environment 1705. The secure environment can be provided by hardware, software, or a combination of both. For instance, the secure environment can be provided by an HSM and/or API. Operations of an example encryption service or module are discussed with respect to FIG. 19. In some embodiments, the encryption module 1706 and the decryption module 1606 discussed in FIG. 16 may be implemented by the same module or different modules.

The above output of the encryption service 1706 can be processed to generate an HTTP response message 1724 that is formatted according to one or more templates such as one or more HTTP templates 1720 and/or one or more JSON content templates 1722. As illustrated, in an embodiment, the output data of the encryption service 1706, the HTTP templates 1720, the JSON content templates 1722 can be provided as inputs to a formatting service or module 1718, which generates a properly formatted HTTP response message 1724. In an embodiment, the HTTP response message 1724 may be formatted according to the JWE specification.

The HTTP response message 1724 includes an HTTP response header 1726 that includes the header data 1708. The header data 1708 may be encoded or obfuscated (e.g., using Base64URL encoding). Exemplary header data 1708 can include public or private key reference (e.g., certificate sequence number), one-time public key, key agreement parameters, list of MACs for payload data, and a global MAC.

The HTTP response message 1724 also includes the encrypted data C 1710 and the encrypted data D 1714 in the HTTP response header 1726 or other suitable portions of the response message. For instance, in an embodiment, the HTTP response message 1724 can include a JWE serialization for data C 1730 and a JWE serialization for data D 1732 in the HTTP response header or another portion of the HTTP response. The JWE serializations can be either JWE JSON serializations or JWE JSON serializations. Each JWE serialization can include a header, a cipher text, and an authentication tag represented in name/value pairs. The data may be Base64URL encoded prior to being included in the JWE serialization. The header of a JWE serialization can include protocol data identifying the encryption algorithm and the encryption key used to encrypt the specific data. For instance, the header for data C JWE serialization 1730 can include identification of the encryption algorithm (e.g., "alg: alg_name") and the encryption key (e.g., "Kid: 1", referring to encryption key $SK_1$) that are used to encrypt data C. The header for data D JWE serialization 1732 can include identification of the encryption algorithm (e.g., "alg: alg_name") and the encryption key (e.g., "Kid: 2", referring to encryption key $SK_2$) that are used to encrypt data D. The cipher text for data C JWE serialization 1730 can include the encrypted data C 1710. The cipher text for data D JWE serialization 1732 can include the encrypted data D 1714. The authentication tag for data C JWE serialization 1730 can include the authentication tag 1712. The authentication tag for data D JWE serialization 1732 can include the authentication tag 1716.

Figure 18:
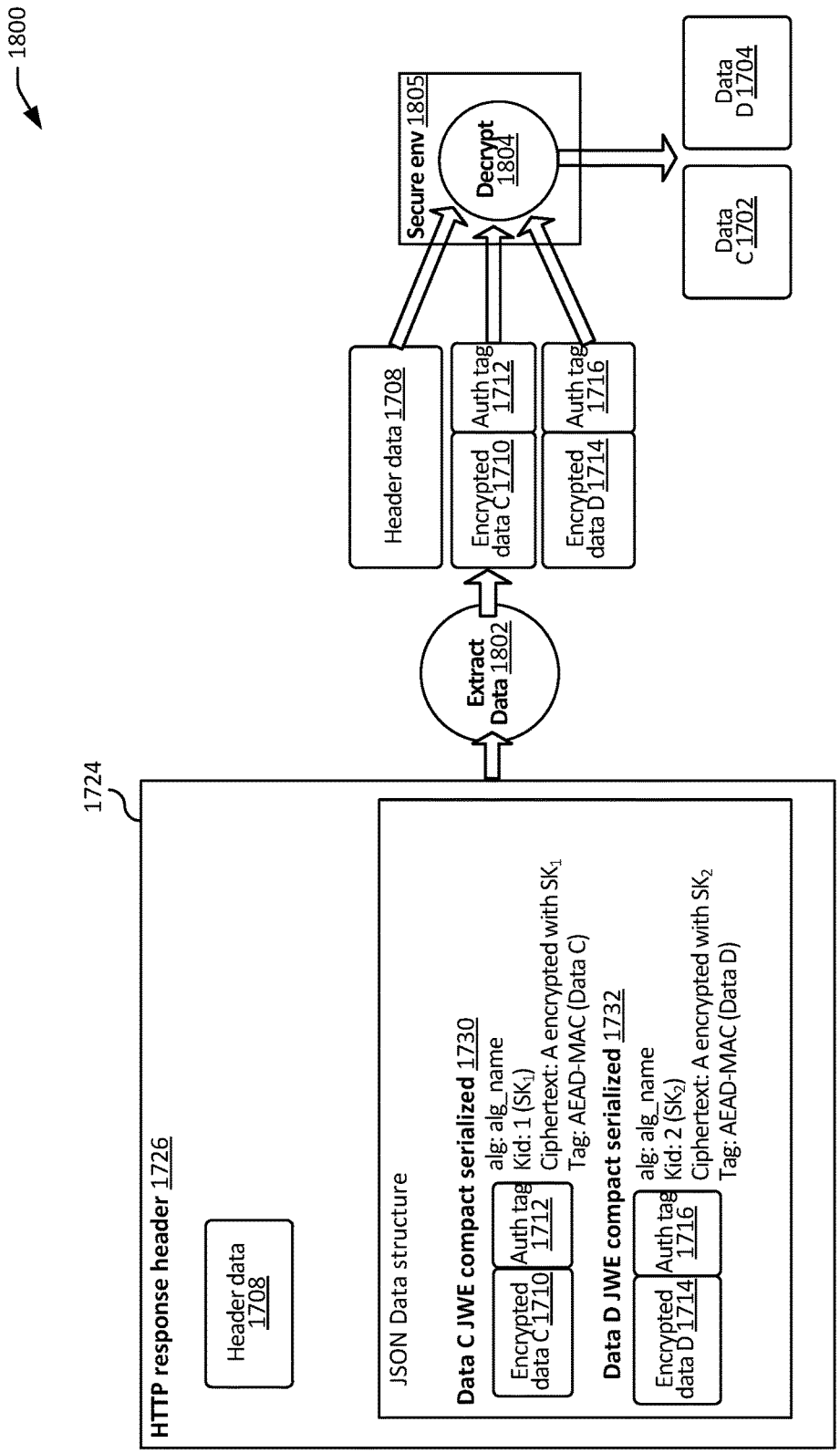
FIG. 18 illustrates an example process for processing an HTTP response message, in accordance with some embodiments.

FIG. 18 illustrates an example process 1800 for processing an HTTP response message, in accordance with some embodiments. The process 1800 can be implemented by a receiver of the HTTP response message such as a client computer. Aspects of the process 1800 may be similar to the process 1600 for decrypting data from an HTTP request message described in FIG. 16.

As illustrated, an HTTP response message 1724 such as described in FIG. 17 can be processed by a parsing module 1802 to extract header data 1708, the encrypted data C 1710 and the associated authentication tag 1712, and the encrypted data D 1514 and the associated authenticated tag 1716.

The extracted data can be fed into a decryption service or module 1804 to obtain the original sensitive data such as sensitive data C 1702 (e.g., PAN information in clear text) and sensitive data D 1704 (e.g., access token hash in clear text).

The decryption service or module 1804 is preferable executed in a relatively secure environment 1805. The secure environment can be provided by hardware, software, or a combination of both. For instance, the secure environment can be provided by an HSM and/or API. Operations of an example decryption service or module are discussed with respect to FIG. 20.

Figure 19:
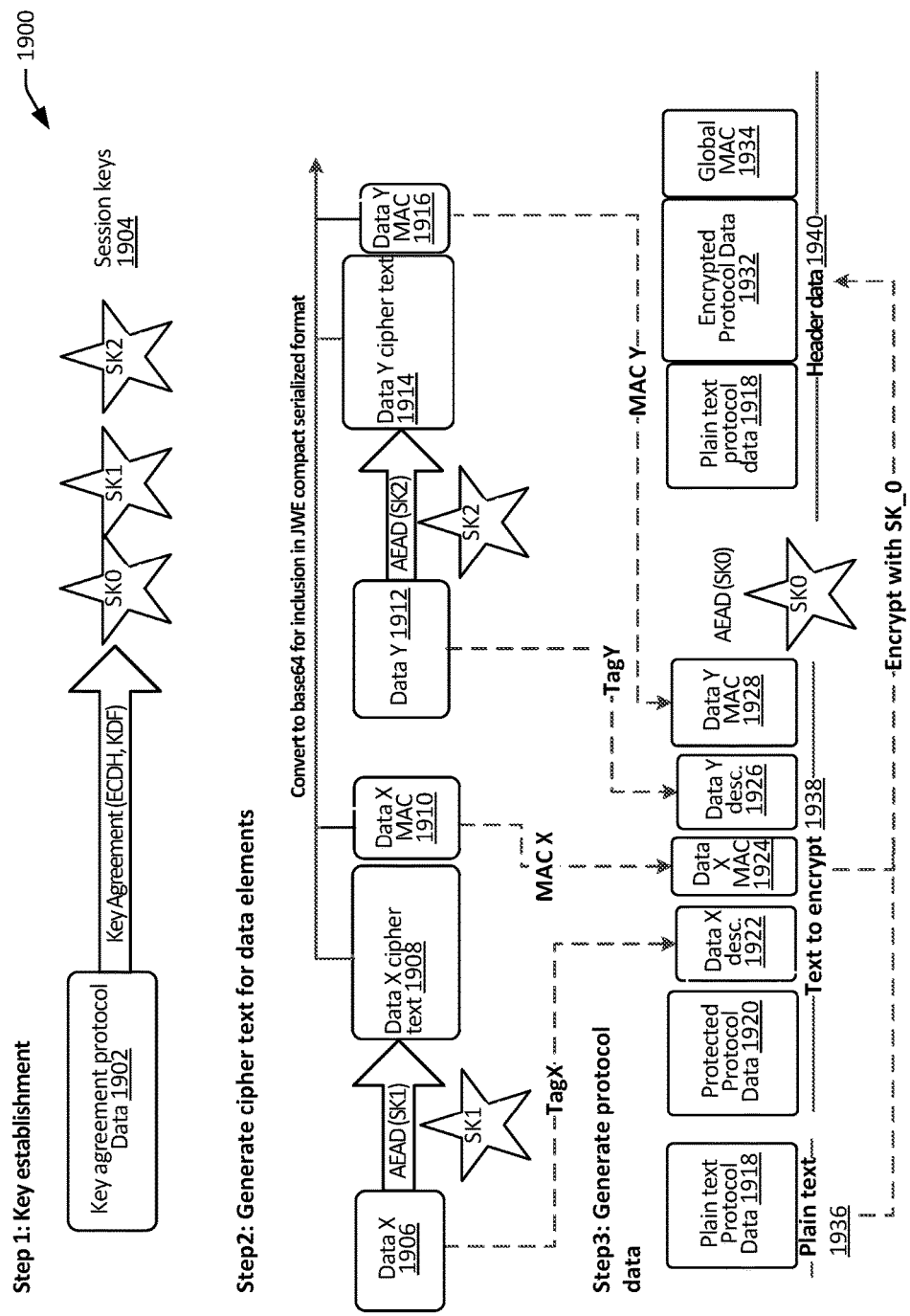
FIG. 19 illustrates an example encryption process for encrypting sensitive data, in accordance with some embodiments.

FIG. 19 illustrates an example encryption process 1900 for encrypting sensitive data, in accordance with some embodiments. The encryption process 1900 can be used to encrypt sensitive data to be included in a request message or a response message. In some embodiments, the encryption process 1900 can be implemented by an encryption service or module such as those discussed above in FIGS. 15 and 17.

Generally, the encryption process 1900 can be used to generate encrypted data for storage, transit, for any other suitable purposes.

At step 1, key agreement protocol data 1902 is used to determine one or more session keys 1904 (e.g., $SK_0$, $SK_1$, and $SK_2$). The key agreement protocol data can include public keys, policies, and the like. Any suitable key agreement algorithms can be used such as ECDH and/or KDFs.

At step 2, cipher text for one or more sensitive payload data elements can be generated. Sensitive data X 1906 can be encrypted using a session key (e.g., $SK_1$) and any suitable encryption algorithm (e.g., AEAD) to generate encrypted data X (e.g., data A cipher text 1908) and an associated message authentication code (e.g., data X MAC 1910). Similarly, sensitive data Y 1912 can be encrypted using a session key (e.g., $SK_2$) and any suitable encryption algorithm (e.g., AEAD) to generate encrypted data Y (e.g., data Y cipher text 1914) and an associated message authentication code (e.g., data Y MAC 1916). In some examples, data X and data Y can correspond to data A and data B discussed in FIGS. 15-16, or data C and data D discussed in FIGS. 17-18, The payload data elements to be encrypted can be represented in any suitable format. In some embodiments, a payload element can be represented in a TLV data structure comprising a tag identifying the element, a length of the element, and a value of the element. For example, data X 1906 may include a tag identifying X (e.g., "tagX"), a size of data X (e.g., 1024 bytes), and a value of the X.

In an embodiment, the encrypted data elements and their MACs can be converted to Base64 encoding for inclusion in JWE compact serialized format. The serialized encrypted data elements can be included in an HTTP message. Examples of such JWE compact serialized encrypted data elements include the JWE serialization for data A 1530 and the JWE serialization for data B 1532 in FIG. 15 and the JWE serialization for data C 1730 and the JWE serialization for data C 1732 in FIG. 17.

At step 3, header data 1940 is generated. Plain text 1936 and text to encrypt 1938 can be encrypted using a session key (e.g., $SK_0$) and any suitable encryption algorithm (e.g., AEAD) to generate the header data 1940 comprising plain text protocol data 1918, a cipher text (e.g., encrypted protocol data 1932), and a global MAC 1934. The plain text 1936 can include plain text protocol data 1918. The plain text protocol data 1918 can include the key agreement protocol data 1902 discussed above such as public keys information (e.g., protected key identifier, one-time public keys). After applying the encryption algorithm, the plain text protocol data 1918 is not encrypted but integrity protected via the global MAC.

The text to encrypt 1938 can include the protected protocol data 1920, and element-specific protocol data for each of the encrypted payload element. The protected protocol data 1920 can include obfuscated or blinded public keys, policies, cipher suite information, and the like. The element-specific protocol data can include a data descriptor (e.g., data X descriptor 1922 or data Y descriptor 1926) and a MAC of a given payload data element (e.g., data X MAC 1924 or data Y descriptor 1928). For example, the data X descriptor 1922 can include a combination (e.g., concatenation) of a tag identifying data X (tag X), encryption key identifier, and a length of the data X MAC. The data Y descriptor 1926 can include a combination (e.g., concatenation) of a tag identifying data Y (tag Y), encryption key identifier, and a length of the data Y MAC.

In an embodiment, the header data 1940 generated in step 3 can be included in a header portion of an HTTP message, such as illustrated by the header data 1508 in FIG. 15 and the header data 1708 in FIG. 17.

Figure 20:
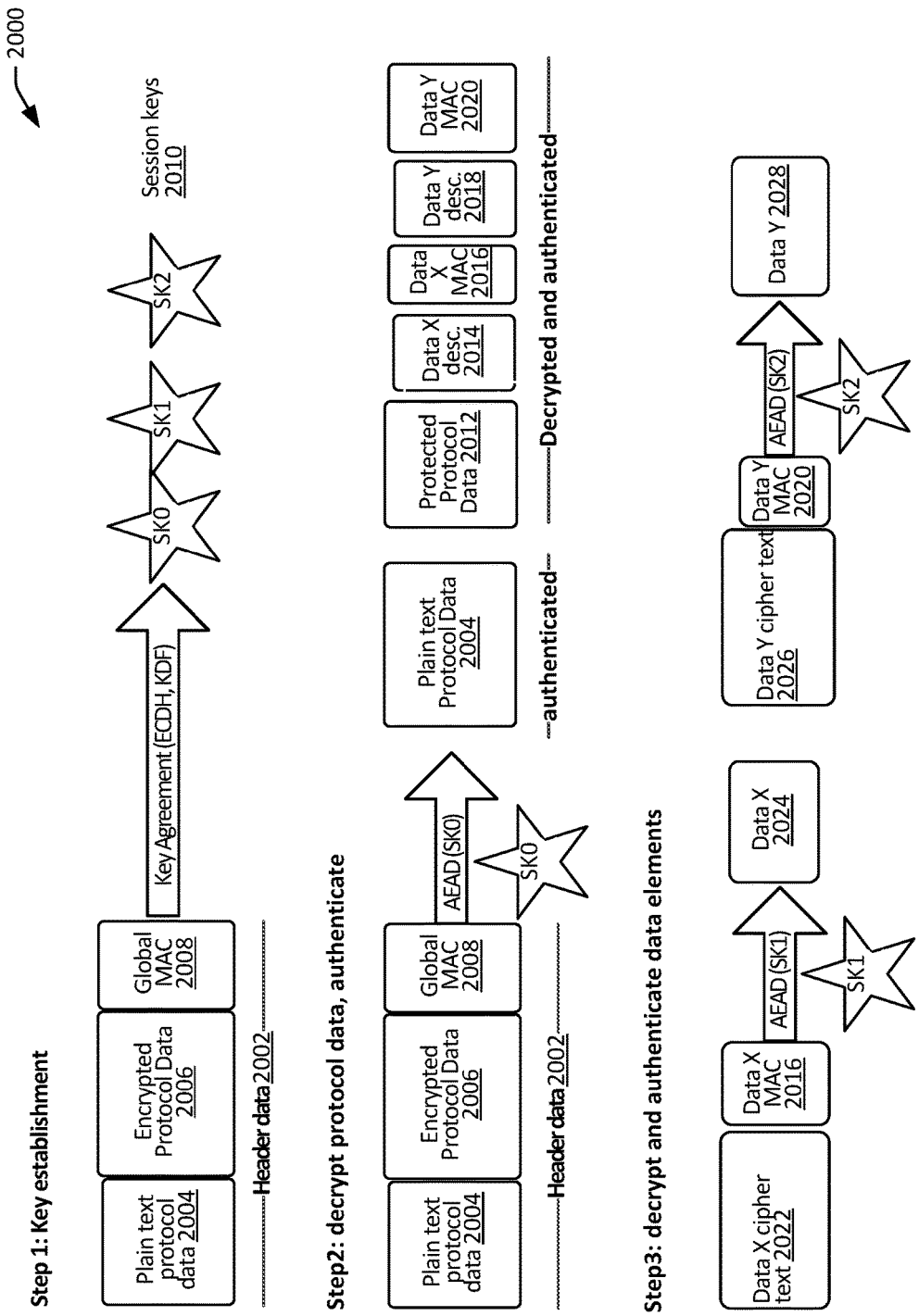
FIG. 20 illustrates an example decryption process for decrypting data, in accordance with some embodiments.

FIG. 20 illustrates an example process 2000 for decrypting data, in accordance with some embodiments. The decryption process 2000 can be used to decrypt data included in a request message or a response message. The data may have been encrypted according to an encryption process such as described in FIG. 19. In some embodiments, the decryption process 2000 can be implemented by a decryption service or module such as those discussed above in FIGS. 16 and 18. Generally, the decryption process 2000 can be used to decrypt encrypted data retrieved from storage, in transit, for any other suitable purposes.

At step 1, some or all of header data 2002 can be used to determine one or more session keys 2010 (e.g., $SK_0$, $SK_1$, and $SK_2$). The session keys 2010 may be the same as those determined in the encryption process as described in FIG. 19. The header data 2002 can be similar to the header data 1940 discussed in FIG. 19. For instance, the header data 2002 can include plain text protocol data 2004, encrypted protocol data 2006, and global MAC 2008. In some embodiments, only the plain text protocol data 2004 of the header data 2002 is used to derive the session keys. 2010. The plain text protocol data 2004 can include key agreement information for deriving the keys such as public keys, policies, and the like. Any suitable key agreement algorithms (e.g., ECDH, KDF) can be used to derive the session keys.

At step 2, the protocol data included in the header data 2002 can be decrypted and authenticated using a session key (e.g., $SK_0$) and a suitable decryption algorithm (e.g., AEAD). The plain text protocol data 2004 can be authenticated using the global MAC 2008. The encrypted protocol data 2006 can be decrypted to obtain the protected protocol data 2012 and element-specific protocol data (e.g., data X descriptor 2014, data X MAC 2016, data Y descriptor 2018, and data Y MAC 2020). The decrypted data can be validated (e.g., using the global MAC 2008).

At step 3, encrypted payload data elements can be decrypted and authenticated. The encrypted payload data elements can be obtained from received serialization objects such as JWE compact serialization objects included in HTTP messages, such as described in FIGS. 15-18. For instance, the data X cipher text 2022 and the data X MAC 2016 can be provided input into a suitable decryption algorithm (e.g., AEAD) using a suitable decryption key (e.g., $SK_1$) to obtain the original data X 2014. The integrity of the data X can be validated using the data X MAC 2016. The data Y cipher text 2026 and the data Y MAC 2020 can be provided input into a suitable decryption algorithm (e.g., AEAD) using a suitable decryption key (e.g., $SK_2$) to obtain the original data X 2028. The integrity of the data Y can be validated using the data Y MAC 2020. In some embodiments, the decryption of the data elements can be performed based on the protocol data (e.g., cipher suite information, element-specific protocol data) obtained from step 2. The encrypted data elements can be decrypted and/or authenticated on an "as needed" basis to reduce the risk of unnecessary exposure of sensitive information.

While FIGS. 19-20 describe the encryption process 1900 and decryption process 2000 as two separate processes, in some embodiments, both can be implemented by a single module or computer. In some other embodiments, the encryption process 1900 and decryption process 2000 may be implemented by different modules or computers.

In some embodiments, the encryption process 1900 and decryption process 2000 can be used to encrypt and decrypt any suitable data types such as documents and data objects. For instance, the encryption process 1900 can be used to encrypt sensitive data fields in a particular document to generate encrypted data fields that replace the sensitive data fields. Encrypted protocol data describing the encryption can also be generated and stored with the document. The encrypted document can be stored or transmitted. An entity may receive the encrypted document over a communication channel (e.g., via a HTTP message) or otherwise wish to access the encrypted document from storage. To access the sensitive data in the document, the decryption process 2000 may be used to decrypt the encrypted document and recover one or more of the sensitive data fields.

IV. Confidential Policy Enforcement

The methods described herein can be used to implement confidential management of server or client policy changes. Such policy changes may be desirable or necessary in various situations. For instance, policy changes may be necessary because a server or client key has expired or been compromised, a client cipher suite is not allowed, a client EC curve is not allowed, a protocol version or mode is invalid, client credentials are invalid or insufficient, a new cipher suite is required, a new certificate is required, and the like. Information necessary to enable the policy change can be transmitted in a confidential and non-traceable manner using the methods described herein. For instance, no data or metadata may be transmitted in the clear. Data integrity check (e.g., using AEAD) can be provided. Messages may be securely padded to remain fixed size.

Figure 21:
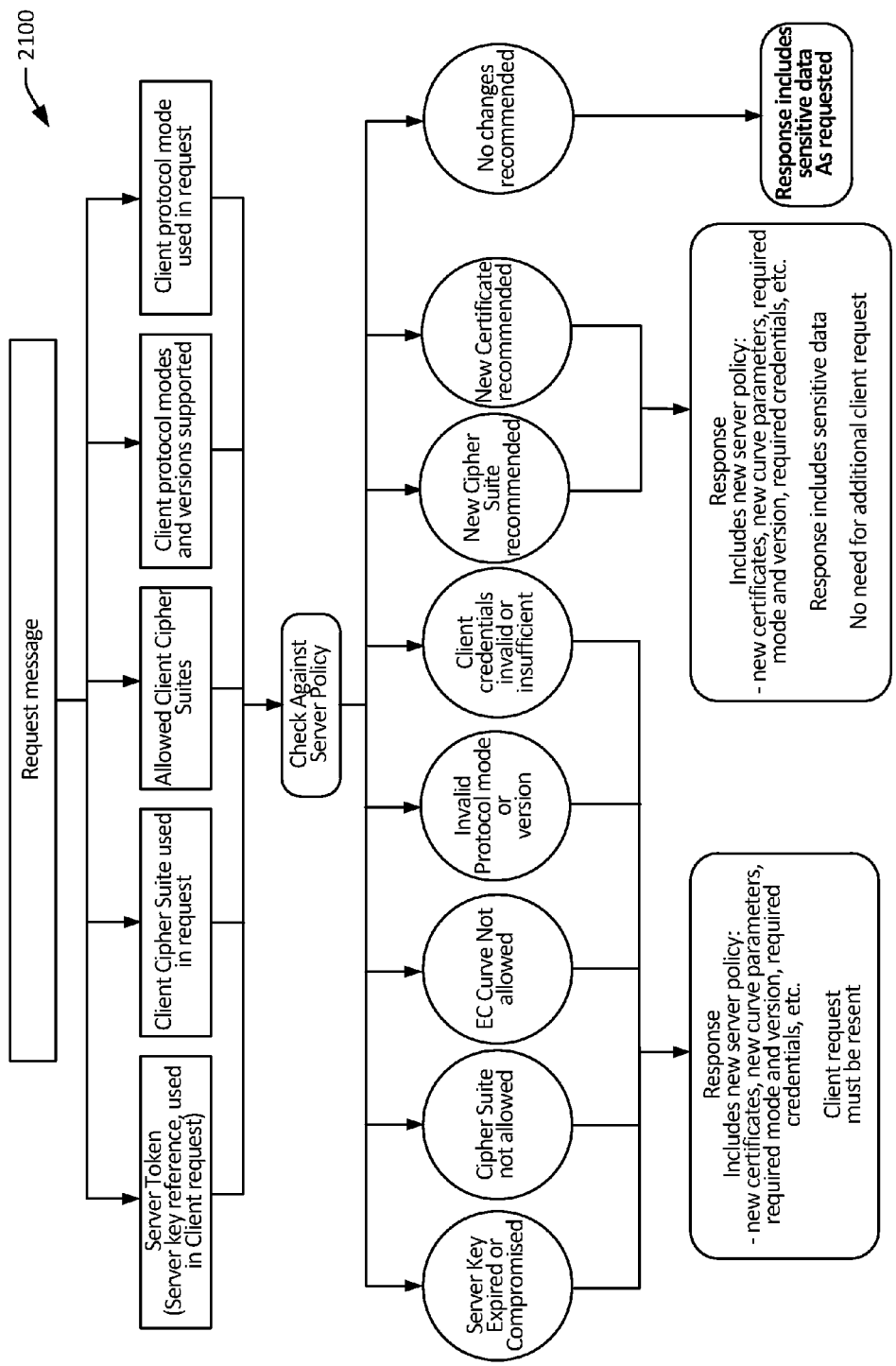
FIG. 21 shows a decision tree for processing a request message to enforce server policies, in accordance with some embodiments.

FIG. 21 shows a decision tree 2100 for processing a request message to enforce server policies, in accordance with some embodiments. The decision tree 2100 may be used by a server computer to process a request message from a client computer.

As illustrated, protocol data included in a request message may be checked against server policy. The protocol data can include a server key reference (e.g., a key identifier), a client cipher suite used in the request message, allowed cipher suites, protocol modes and versions supported by client, client protocol mode used in request, and the like. Some or all of the protocol data may be protected (e.g., encrypted and/or integrity protected) using methods discussed herein.

Based on the server policy and the protocol data included in the request message, different actions may be taken by the server computer. In some cases, the response message may establish a new server policy and a client request must be resent. Such cases may include when the server key has expired or compromised, when the cipher suite is not allowed, when the EC curve is not allowed, when the client protocol mode or version is invalid, when the client credentials are invalid or insufficient, and the like. The new server policy indicated by the response message can include one or more new certificate or public keys, new curve parameters, required mode or version, required credentials, and the like.

In some other cases, the response message may establish a new server policy and a client request need not be resent. Such cases may include when a new cipher suite is recommended, when a new certificate or public key is recommended, and the like.

In yet some other cases, such as when no changes are recommended, the response may include any sensitive data that has been requested by the request message.

V. Computer Apparatus

Figure 22:
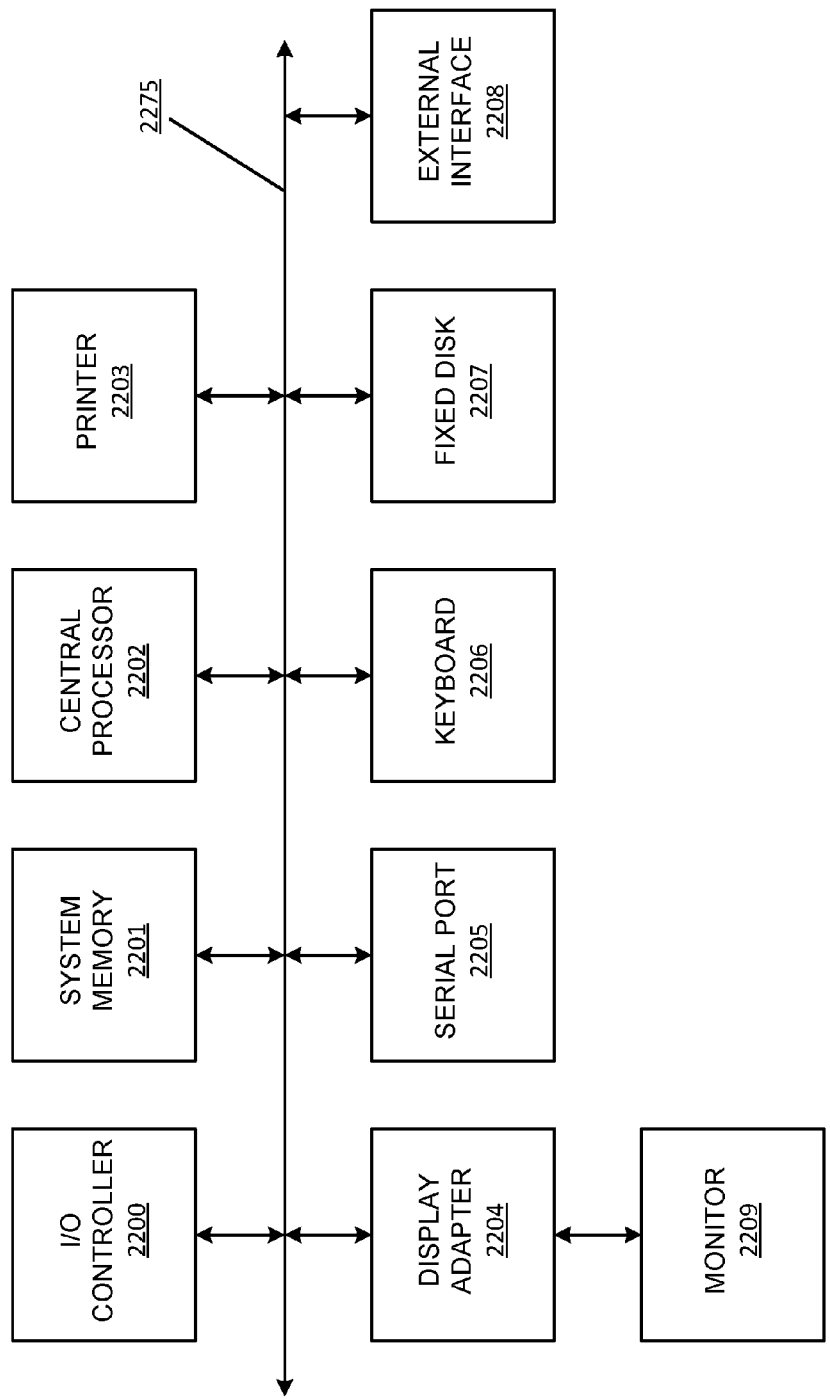
FIG. 22 is a high level block diagram of a computer system, in accordance with some embodiments.

FIG. 22 is a high level block diagram of a computer system that may be used to implement any of the entities or components described above. The subsystems shown in FIG. 22 are interconnected via a system bus 2275. Additional subsystems include a printer 2203, keyboard 2206, fixed disk 2207, and monitor 2209, which is coupled to display adapter 2204. Peripherals and input/output (I/O) devices, which couple to I/O controller 2200, can be connected to the computer system by any number of means known in the art, such as a serial port. For example, serial port 2205 or external interface 2208 can be used to connect the computer apparatus to a wide area network such as the Internet, a mouse input device, or a scanner. The interconnection via system bus 2275 allows the central processor 2202 to communicate with each subsystem and to control the execution of instructions from system memory 2201 or the fixed disk 2207, as well as the exchange of information between subsystems. The system memory 2201 and/or the fixed disk may embody a computer-readable medium.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A computer-implemented method, comprising:
receiving, by a server computer from a client computer, at least a portion of a request message including a protected server key identifier, a one-time client public key, and encrypted request data, wherein request data is encrypted using a request shared secret derived using a server public key and a one-time client private key associated with the one-time client public key;
decrypting, by the server computer, the protected server key identifier using a server identifier encryption key to obtain and to validate a server key identifier;
determining, by the server computer, a server private key associated with the validated server key identifier; and
decrypting, by the server computer, the encrypted request data using the server private key and the one-time client public key to obtain the request data associated with the portion of the request message.

2. The computer-implemented method of claim 1, wherein the server identifier encryption key is determined based on a default key pair comprising a default public key and a default private key.

3. The computer-implemented method of claim 1, wherein decrypting the encrypted request data comprises:
determining the request shared secret based on the server private key and the one-time client public key;
deriving a request session key based on the request shared secret; and
decrypting the encrypted request data using the request session key.

4. The computer-implemented method of claim 1, wherein the protected server key identifier is decrypted to obtain the server key identifier and a padding element, and the method further comprises validating the padding element before determining the server private key associated with the server key identifier.

5. The computer-implemented method of claim 1, further comprising:
for another request message including other encrypted request data, determining that another protected server key identifier does not map to an existing server private key and decrypting the other encrypted request data using a default server private key to obtain other request data.

6. The computer-implemented method of claim 1, further comprising:
determining a second server key identifier to be used in a next request from the client computer, the second server key identifier being associated with a second server private key;
encrypting the second server key identifier using the server identifier encryption key to determine a second protected server key identifier;
encrypting response data comprising the second protected server key identifier to generate encrypted response data; and
sending a response message including the encrypted response data to the client computer.

7. The computer-implemented method of claim 6, wherein encrypting the second server key identifier comprises encrypting a combination of the second server key identifier, a padding element, and a random element using the server identifier encryption key, the padding element being a constant value or a message authentication code (MAC) of the second server key identifier.

8. The computer-implemented method of claim 6, wherein the response message further comprises an obfuscated server public key corresponding to the second server private key.

9. The computer-implemented method of claim 6, wherein the request data includes a protected client key identifier and the response message includes the protected client key identifier, wherein protected client key identifier is used, by the client computer, to determine a client private key for decrypting the response message.

10. A computer-implemented method, comprising:
encrypting, by a sender computer, protocol data using one or more protocol encryption keys to generate encrypted protocol data, the protocol data indicating a cipher suite and/or a key identifier;
encrypting, by the sender computer, at least a portion of payload data using the protocol data and one or more payload encryption keys to generate encrypted payload data, wherein the one or more protocol encryption keys and the one or more payload encryption keys are determined based on one or more shared secrets, each generated using a receiver public key of a receiver computer and a sender private key of the sender computer, at least one of which is a one-time key; and
transmitting, by the sender computer to the receiver computer, a message comprising the encrypted payload data and the encrypted protocol data.

11. The computer-implemented method of claim 10, wherein the payload data comprises a plurality of payload elements and encrypting the payload data comprises encrypting each payload element of the plurality of payload elements using a corresponding payload encryption key to generate an encrypted payload element.

12. The computer-implemented method of claim 11, wherein the protocol data further comprises a plurality of data-protocol mappings respectively corresponding to the plurality of payload elements, each of the plurality of data-protocol mappings comprising a corresponding key identifier and an algorithm identifier, the corresponding key identifier identifying a payload encryption key used to encrypt the corresponding payload element, and the algorithm identifier identifying a cryptographic algorithm used to encrypt the corresponding payload element.

13. The computer-implemented method of claim 12, wherein each data-protocol mapping of the plurality of data-protocol mapping further comprises a message authentication code (MAC) of the corresponding payload element.

14. The computer-implemented method of claim 13, wherein the message further comprises a global MAC that is calculated based on the MACs corresponding to the plurality of payload elements.

15. A computer system comprising:
a memory that stores computer-executable instructions; and
one or more hardware processors configured to access the memory and execute the computer-executable instructions to implement a method comprising:
receiving a message comprising encrypted protocol data and encrypted payload data;
determining one or more protocol decryption keys;
decrypting the encrypted protocol data using the one or more protocol decryption keys to obtain protocol data indicating a cipher suite and/or a key identifier;
determining one or more payload decryption keys, wherein the one or more payload decryption keys and the one or more protocol decryption keys are determined based on one or more shared secrets, each generated using a sender public key and a receiver private key, at least one of which is a one-time key; and
decrypting the encrypted payload data using the protocol data and the one or more payload decryption keys to obtain payload data.

16. The computer system of claim 15, wherein the encrypted protocol data comprises an encrypted cipher suite, and wherein the one or more hardware processors are further configured to execute the computer-executable instructions to implement:
decrypting the encrypted cipher suite using a first protocol decryption key to obtain the cipher suite.

17. The computer system of claim 16, wherein the encrypted payload data comprises a plurality of encrypted payload elements and the encrypted protocol data further comprises a plurality of encrypted data-protocol mappings respectively corresponding to the plurality of encrypted payload elements, and wherein the one or more hardware processors are further configured to execute the computer-executable instructions to implement:
decrypting the plurality of encrypted data-protocol mappings using the cipher suite and a second protocol decryption key to obtain a plurality of data-protocol mappings.

18. The computer system of claim 17, wherein decrypting the encrypted payload data comprises decrypting an encrypted payload element of the plurality of encrypted payload elements by:
determining a data-protocol mapping from the plurality of data-protocol mappings that corresponds to the encrypted payload element;
selecting a payload decryption key for decrypting the encrypted payload element from the one or more payload decryption keys based at least in part on the data-protocol mapping;
identifying a decryption algorithm for decrypting the encrypted payload element based at least in part on the data-protocol mapping; and
decrypting the encrypted payload element using the selected payload decryption key and the identified decryption algorithm to obtain the payload element.

19. The computer system of claim 18, wherein the data-protocol mapping comprises a message authentication code (MAC) and decrypting the encrypted payload data further comprises validating the MAC.

20. A computer system comprising:
a memory that stores computer-executable instructions; and
one or more hardware processors configured to access the memory and execute the computer-executable instructions to implement a method comprising:
receiving, by a server computer from a client computer, at least a portion of a request message including a protected server key identifier, a one-time client public key, and encrypted request data, wherein request data is encrypted using a request shared secret derived using a server public key and a one-time client private key associated with the one-time client public key;
decrypting, by the server computer, the protected server key identifier using a server identifier encryption key to obtain and to validate a server key identifier;
determining, by the server computer, a server private key associated with the validated server key identifier; and decrypting, by the server computer, the encrypted request data using the server private key and the one-time client public key to obtain the request data associated with the portion of the request message.

21. The computer system of claim 20, wherein the server identifier encryption key is determined based on a default key pair comprising a default public key and a default private key.

22. The computer system of claim 20, wherein decrypting the encrypted request data comprises:
determining the request shared secret based on the server private key and the one-time client public key;
deriving a request session key based on the request shared secret; and
decrypting the encrypted request data using the request session key.

23. The computer system of claim 20, wherein the protected server key identifier is decrypted to obtain the server key identifier and a padding element, wherein the one or more hardware processors are further configured to execute the computer-executable instructions to implement:
validating the padding element before determining the server private key associated with the server key identifier.

24. The computer system of claim 20, wherein the one or more hardware processors are further configured to execute the computer-executable instructions to implement:
for another request message including other encrypted request data, determining that another protected server key identifier does not map to an existing server private key and decrypting the other encrypted request data using a default server private key to obtain other request data.

25. The computer system of claim 20, wherein the one or more hardware processors are further configured to execute the computer-executable instructions to implement:
determining a second server key identifier to be used in a next request from the client computer, the second server key identifier being associated with a second server private key;
encrypting the second server key identifier using the server identifier encryption key to determine a second protected server key identifier;
encrypting response data comprising the second protected server key identifier to generate encrypted response data; and
sending a response message including the encrypted response data to the client computer.

26. The computer system of claim 25, wherein encrypting the second server key identifier comprises encrypting a combination of the second server key identifier, a padding element, and a random element using server the identifier encryption key, the padding element being a constant value or a message authentication code (MAC) of the second server key identifier.

27. The computer system of claim 25, wherein the response message further comprises an obfuscated server public key corresponding to the second server private key.

28. The computer system of claim 25, wherein the request data includes a protected client key identifier and the response message includes the protected client key identifier, wherein protected client key identifier is used, by the client computer, to determine a client private key for decrypting the response message.

29. A computer system comprising:
a memory that stores computer-executable instructions; and
one or more hardware processors configured to access the memory and execute the computer-executable instructions to implement a method comprising:
encrypting, by a sender computer, protocol data using one or more protocol encryption keys to generate encrypted protocol data, the protocol data indicating a cipher suite and/or a key identifier;
encrypting, by the sender computer, at least a portion of payload data using the protocol data and one or more payload encryption keys to generate encrypted payload data, wherein the one or more protocol encryption keys and the one or more payload encryption keys are derived using one or more shared secrets, each generated using a receiver public key of a receiver computer and a sender private key of the sender computer, at least one of which is a one-time key; and
transmitting, by the sender computer to the receiver computer, a message comprising the encrypted payload data and the encrypted protocol data.

30. The computer system of claim 29, wherein the payload data comprises a plurality of payload elements and encrypting the payload data comprises encrypting each payload element of the plurality of payload elements using a corresponding payload encryption key to generate an encrypted payload element.

31. The computer system of claim 30, wherein the protocol data further comprises a plurality of data-protocol mappings respectively corresponding to the plurality of payload elements, each of the plurality of data-protocol mappings comprising a corresponding key identifier and an algorithm identifier, the corresponding key identifier identifying a payload encryption key used to encrypt the corresponding payload element, and the algorithm identifier identifying a cryptographic algorithm used to encrypt the corresponding payload element.

32. The computer system of claim 31, wherein each data-protocol mapping of the plurality of data-protocol mapping further comprises a message authentication code (MAC) of the corresponding payload element.

33. The computer system of claim 32, wherein the message further comprises a global MAC that is calculated based on the MACs corresponding to the plurality of payload elements.

34. A computer-implemented method comprising:
receiving a message comprising encrypted protocol data and encrypted payload data;
determining one or more protocol decryption keys;
decrypting the encrypted protocol data using the one or more protocol decryption keys to obtain protocol data indicating a cipher suite and/or a key identifier;
determining one or more payload decryption keys, wherein the one or more payload decryption keys and the one or more protocol decryption keys are determined based on one or more shared secrets, each generated using a sender public key and a receiver private key, at least one of which is a one-time key; and
decrypting the encrypted payload data using the protocol data and the one or more payload decryption keys to obtain payload data.

35. The computer-implemented method of claim 34, wherein the encrypted protocol data comprises an encrypted cipher suite, and wherein the method further comprises decrypting the encrypted cipher suite using a first protocol decryption key to obtain the cipher suite.

36. The computer-implemented method of claim 35, wherein the encrypted payload data comprises a plurality of encrypted payload elements and the encrypted protocol data further comprises a plurality of encrypted data-protocol mappings respectively corresponding to the plurality of encrypted payload elements, and wherein the method further comprises decrypting the plurality of encrypted data-protocol mappings using the cipher suite and a second protocol decryption key to obtain a plurality of data-protocol mappings.

37. The computer-implemented method of claim 36, wherein decrypting the encrypted payload data comprises decrypting an encrypted payload element of the plurality of encrypted payload elements by:
- determining a data-protocol mapping from the plurality of data-protocol mappings that corresponds to the encrypted payload element;
- selecting a payload decryption key for decrypting the encrypted payload element from the one or more payload decryption keys based at least in part on the data-protocol mapping;
- identifying a decryption algorithm for decrypting the encrypted payload element based at least in part on the data-protocol mapping; and
- decrypting the encrypted payload element using the selected payload decryption key and the identified decryption algorithm to obtain the payload element.

38. The computer-implemented method of claim 37, wherein the data-protocol mapping comprises a message authentication code (MAC) and decrypting the encrypted payload data further comprises validating the MAC.

* * * * *

UNITED STATES PATENT AND TRADEMARK OFFICE
CERTIFICATE OF CORRECTION

PATENT NO. : 9,942,034 B2
APPLICATION NO. : 15/045052
DATED : April 10, 2018
INVENTOR(S) : Eric Le Saint and Soumendra Bhattacharya Page 1 of 1

It is certified that error appears in the above-identified patent and that said Letters Patent is hereby corrected as shown below:

In the Claims

In Column 51, Claim 26, Line 54 please remove "element using server the identifier" and insert -- element using the server identifier --

Signed and Sealed this
Twenty-fourth Day of July, 2018

Andrei Iancu
*Director of the United States Patent and Trademark Office*